United States Patent
Weber et al.

(10) Patent No.: US 8,400,472 B2
(45) Date of Patent: Mar. 19, 2013

(54) METHOD AND SYSTEM OF GEOMETRIC DEFORMATION

(75) Inventors: Ofir Weber, RaAnana (IL); Mirela Ben-Chen, Binyamina (IL); Craig(Chaim) Gotsman, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 969 days.

(21) Appl. No.: 12/379,575

(22) Filed: Feb. 25, 2009

(65) Prior Publication Data

US 2010/0214312 A1     Aug. 26, 2010

(51) Int. Cl.
*G09G 5/37* (2006.01)
(52) U.S. Cl. .................... 345/647
(58) Field of Classification Search ............ 345/647
See application file for complete search history.

(56) References Cited

U.S. PATENT DOCUMENTS

| | | | |
|---|---|---|---|
| 6,119,033 A * | 9/2000 | Spigelman et al. | 600/426 |
| 6,300,958 B1 * | 10/2001 | Mallet | 345/442 |
| 6,734,851 B2 * | 5/2004 | Georgiev | 345/419 |
| 6,853,373 B2 * | 2/2005 | Williams et al. | 345/419 |
| 2005/0259882 A1 * | 11/2005 | Dewaele | 382/243 |
| 2007/0291845 A1 * | 12/2007 | Cammas et al. | 375/240.16 |

OTHER PUBLICATIONS

Viseme recognition—a comparative study Leszczynski, M.; Skarbek, W.; Advanced Video and Signal Based Surveillance, 2005. AVSS 2005. IEEE Conference on Digital Object Identifier: 10.1109/AVSS.2005.1577282 Publication Year: 2005 , pp. 287-292.*
Mean value coordinates for closed triangular meshes Tao Ju, Scott Schaefer, Joe Warren Jul. 2005 SIGGRAPH '05: SIGGRAPH 2005 Papers Publisher: ACM Request Permissions.*
Harmonic coordinates for character articulation Pushkar Joshi, Mark Meyer, Tony DeRose, Brian Green, Tom Sanocki Aug. 2007 SIGGRAPH '07: SIGGRAPH 2007 papers Publisher: ACM Request Permissions.*
K Hormann—Barycentric Coordinates for Arbitrary Polygons in the Plane. Kai Hormann. Institute of Computer Science, Clausthal University of Technology, Germany. 2005.*
Binet-Cauchy Kernels on Dynamical Systems and its Application to the Analysis of Dynamic Scenes; S. V. N. Vishwanathan, Alexander J. Smola and René Vidal, International Journal of Computer Vision; vol. 73, No. 1, 95-119, DOI: 10.1007/s11263-006-9352-0; 2007.*

* cited by examiner

Primary Examiner — Javid A Amini

(57) ABSTRACT

A method of deforming a geometric object. The method comprises providing a data segment representing a geometric object, defining a contour enclosing the geometric object in the data segment, calculating a plurality of barycentric coordinates having a plurality of complex coefficients according to the enclosing contour, receiving user input to manipulate the enclosing contour to a target contour, and using the plurality of barycentric coordinates according to the target contour for mapping the geometric object to a target geometric object.

22 Claims, 11 Drawing Sheets

METHOD AND SYSTEM OF GEOMETRIC DEFORMATION

FIELD AND BACKGROUND OF THE INVENTION

The present invention, in some embodiments thereof, relates to a method and a system for data processing and, more particularly, but not exclusively, to a method and a system for deforming a geometric objects in data segments.

During the last years, numerous graphics applications have been developed, for example for image deformation, such as "warping" or "morphing" in which one image gradually transformed into another image. This is accomplished by creating a smooth transitional link between the two images. Some computer programs, for example, use warping to generate an animation sequence using the image transformations. Such an animation might, for example, show a first person's face transforming into a second person's face.

The warping process ought to preserve features associated with each image by mapping the features from a data segment to corresponding features in a target image. In particular, mesh warping warps a first image into a second image using a point-to-point mapping from the first image to the second image. A first lattice (mesh) is superimposed on the first image and second lattice is superimposed on the second image. For each point in the first lattice, a one-to-one correspondence with a corresponding point in the second lattice is defined. Mesh warping is generally described in George Wolberg, Digital Image Warping, IEEE Computer Society Press (1990). Variations on mesh warping include a version in which the user specifies lines on the first image corresponding to lines on the second image. These user-specified lines are used to construct corresponding lattices, which are used to morph the first image into the second image, as described above.

For example U.S. Pat. No. 6,734,851, filed on Apr. 24, 2003, describes a computer-implemented system performs a conformal warp operation using a unique warping function to map a first area to a second area. The first area is defined by a first enclosing contour and the second area is defined by a second enclosing contour. The system defines the first enclosing contour; modifies the first enclosing contour into the second enclosing contour; generates an analytic function to conformally warp the first area into the second area; and performs the conformal warp using the analytic function.

Barycentric coordinates allows inferring continuous data over a domain from discrete or continuous values on the boundary of the domain. Barycentric coordinates are used in a wide range of applications, such as shading, interpolation, parameterization, and, space deformations, see, respectively, Ju T., Schaefer S., Warren J.: Mean value coordinates for closed triangular meshes, ACM Trans. Graph, (Proc. SIGGRAPH), 24, 3 (2005), 561-566, Desbrun M., Meyer M., Alliez P.: Intrinsic parameterizations of surface meshes. Computer Graphics Forum, 21 (2002), 209-218, Schreiner J., Asirvatham A., Praun E., Hoppe H.: Inter-surface mapping, ACM Trans. Graph, (Proc. SIGGRAPH). 23, 3 (2004), 870-877, Joshi P., Meyer M., DeRose T., Green B., Sanocki T.: Harmonic coordinates for character articulation, ACM Trans. Graph, (Proc. SIGGRAPH), 26, 3 (2007), 71, Lipman Y., Kopf J., Cohen-Or D., Levin D.: GPU-assisted positive mean value coordinates for mesh deformations. Proc. Symp. Geometry Processing (2007), pp. 117-123, and Lipman Y., Levin D., Cohen-Or D.: Green coordinates, ACM Trans. Graph, (Proc. SIGGRAPH), 27, 3 (2008), which are incorporated herein by reference.

Traditionally, barycentric coordinates in $R^n$ are defined as the real coefficients of an affine combination of vectors in $R^n$. As such, they operate identically on each coordinate.

SUMMARY OF THE INVENTION

According to some embodiments of the present invention there is provided a method of deforming a geometric object. The method comprises providing a data segment representing a geometric object, defining a contour enclosing the geometric object in the data segment, calculating a plurality of barycentric coordinates having a plurality of complex coefficients according to the enclosing contour, receiving user input to manipulate the enclosing contour to a target contour, and using the plurality of barycentric coordinates according to the target contour for mapping the geometric object to a target geometric object.

Optionally, the data segment comprises an image.

More optionally, the image is defined according to a member of a group consisting of a bitmap image format and a vector image format.

More optionally, the providing comprises displaying the image to a user.

Optionally, the enclosing comprises specifying a plurality of control points according to the enclosing contour and using the plurality of control points for calculating the plurality of complex coefficients.

More optionally, the user input comprising a manipulation to at least one of the plurality of control points, and the mapping comprising applying the plurality of barycentric coordinates to the plurality of manipulated control points.

More optionally, the target geometric object is bounded by the target contour.

More optionally, the contour is polygonal, the plurality of control points are plurality of vertices.

Optionally, the plurality of complex coefficients are calculated according to Cauchy kernel.

Optionally, the enclosing contour has a B-spline contour.

More optionally, the calculating comprises calculating a complex integral according to the plurality of control points and using the complex integral for calculating the plurality of complex coefficients.

Optionally, the mapping is based on a complex deformation function defined according to the plurality of barycentric coordinates.

Optionally, the plurality of barycentric coordinates are calculated according to edges of the enclosing contour.

More optionally, the plurality of barycentric coordinates are defined for mapping each point in the geometric object according to a non Euclidean distance thereof from at least one of the plurality of control points.

More optionally, the specifying comprising selecting each the control point according to a compliance with a finite set of positional constraints.

More optionally, the specifying comprising receiving an additional user input defining the plurality of the control points.

Optionally, the enclosing comprises automatically segmenting the geometric object.

Optionally, the data segment is a member of a group consisting of: a digital image, a bitmap, and a video frame.

According to some embodiments of the present invention there is provided a computer program product that comprises a computer usable medium having a computer readable program code embodied therein, the computer readable program code adapted to be executed to implement a method for method of deforming an image. The computer program comprises providing a data segment representing a geometric object, defining a contour enclosing the geometric object in the data segment, calculating a plurality of barycentric coordinates having complex coefficients according to the enclosing contour, receiving user input to manipulate the enclosing contour to a target contour, and using the plurality of complex barycentric coordinates according to the target contour for mapping the geometric object to a target geometric object.

Optionally, the enclosing comprises specifying a plurality of control points according to the enclosing contour and using the plurality of control points for calculating the plurality of complex coefficients.

More optionally, the plurality of complex coefficients are defined for mapping each the pixel according to a non Euclidean distance thereof from at least one of the plurality of control points.

More optionally, the specifying comprising selecting each the control point according to a compliance with a finite set of positional constraints.

According to some embodiments of the present invention there is provided a system for estimating image similarity. The system comprises an input unit configured for receiving a data segment having a geometric object enclosed by a contour and a manipulation of the contour being indicative to a target contour, a deformation unit configured for calculating a complex deformation function having complex coefficients according to the target contour and deforming the geometric object according to the complex deformation function, and an output module configured for outputting a new image depicting the deformed geometric object.

According to some embodiments of the present invention there is provided a method of coloring a geometric object. The method comprises providing an image data representing a geometric object, defining a plurality of control points on the geometric object, calculating a plurality of barycentric coordinates having a plurality of complex coefficients according to the plurality of control points, specifying a plurality of complex color values for the plurality of control points, and coloring a plurality of points in the geometric object each by using the plurality of barycentric coordinates according to the plurality of complex color values.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
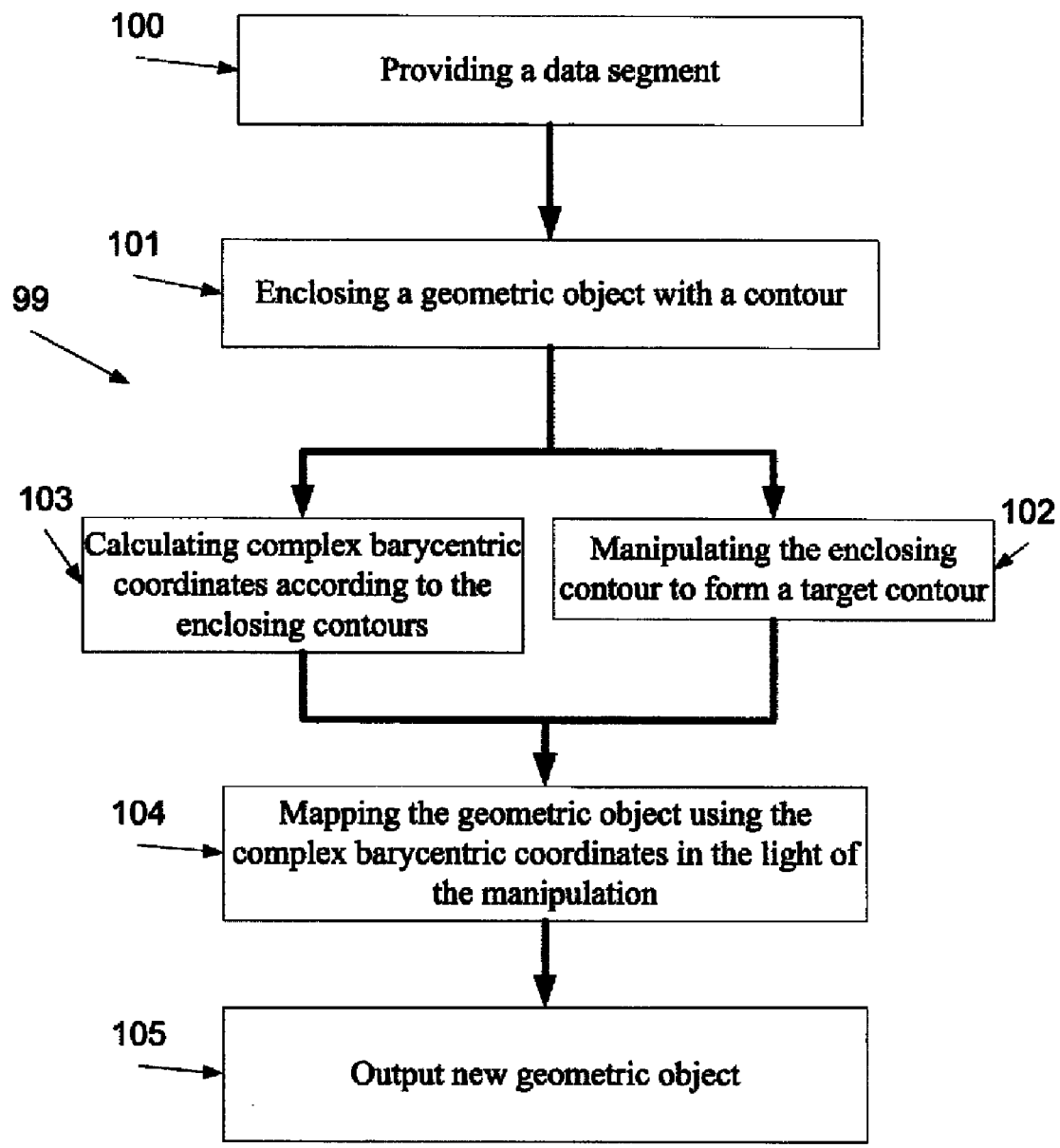
FIG. 1 is a flowchart of a method of deforming a geometric object according to positional constraints manipulation, according to some embodiments of the present invention.

The present invention, in some embodiments thereof, relates to a method and a system for data processing and, more particularly, but not exclusively, to a method and a system for deforming geometric objects in data segments.

According to some embodiments of the present invention, there is provided a system and a method for deforming a geometric object using complex barycentric coordinates. The method is based on providing a data segment, such as a data segment, represented by a bitmap or one or more graphical object, data segment and enclosing a contour, such as a polygonal contour or a B-spline contour around a geometric object in the data segment. The contour may be manually defined by the user and/or automatically defined by a segmentation module. Optionally, a plurality of control points are defined along the contour, for example the vertices thereof. The enclosing contour allows calculating a plurality of barycentric coordinates having complex coefficients, referred to herein as complex barycentric coordinates, for example as described below. In use, a user input that is indicative to a manipulation of the enclosing contour to a target contour is received. For example, the user may use an input device, such as a mouse and a touch screen, for manipulating or more of the control points. The plurality of complex barycentric coordinates may now be applied, according to the target contour, for mapping some or all of the pixels of the geometric object to a target geometric object. For example, the mapping is performed using a complex deformation function that is applied to the geometric object's pixels. Optionally, the mapping is performed by superimposing a source lattice, such as a mesh, on a graphical representation of the data segment and generating a respective a target lattice which is used as a skeleton for the mapping. Then, some or all the points in the source lattice are mapped in a one-to-one correspondence with points in the target lattice. Optionally, each point of the geometric object, which is represented by a respective point in the source lattice, is mapped according to a non Euclidean distance thereof from the plurality of control points. In such a manner, mapping points according to the lattice correspondence is affected by the non Euclidean distance of the points from the control points rather than by their Euclidean distance from the control points. In such a manner, points which mapped by a segment of the lattice which is located in one projection of the contour of the geometric object, are less or not affected by the manipulation of control points in a short Euclidean distance therefrom, which are positioned on or in another part of the contour.

The method and the system may be used for graphic applications such as wrapping, morphing, and/or otherwise deforming a geometric object. For instance, the method may be used for animating geometric objects depicting one or more figures. Optionally, the control points are manually selected by the user, on the contour and/or within the boundaries of the geometric object.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a flowchart 99 of a method of deforming a geometric object according to positional constraints manipulation, according to some embodiments of the present invention. As used herein, deforming means wrapping, morphing, adapting to a surface, such as a mesh, a polygonal soup, and a NURBS surface, and/or otherwise manipulating the geometric object.

First, as shown at 100, a data segment is provided. Optionally, the data segment is selected and/or uploaded by a user and displayed on a display device, such as a screen. Optionally, the data segment comprises a digital image, such as a bitmap, one or more vector graphic objects, a compressed image, a frame of a video file, and any representation of a virtual or a real scene, in a continuous or a discrete manner. For example, the data segment may be in a bitmap image format, for example defined according to portable document format (PDF), tagged image file format (TIFF), joint photographic experts group (JPG), bit map (BMP) format and vector image format, such as a Adobe™ Flash format, Adobe™ Illustrator format and a drawing exchange format (DXF).

Optionally, a source lattice is super imposed on the received data segment, allowing a non discrete reference to points of the data segment.

Figure 2:
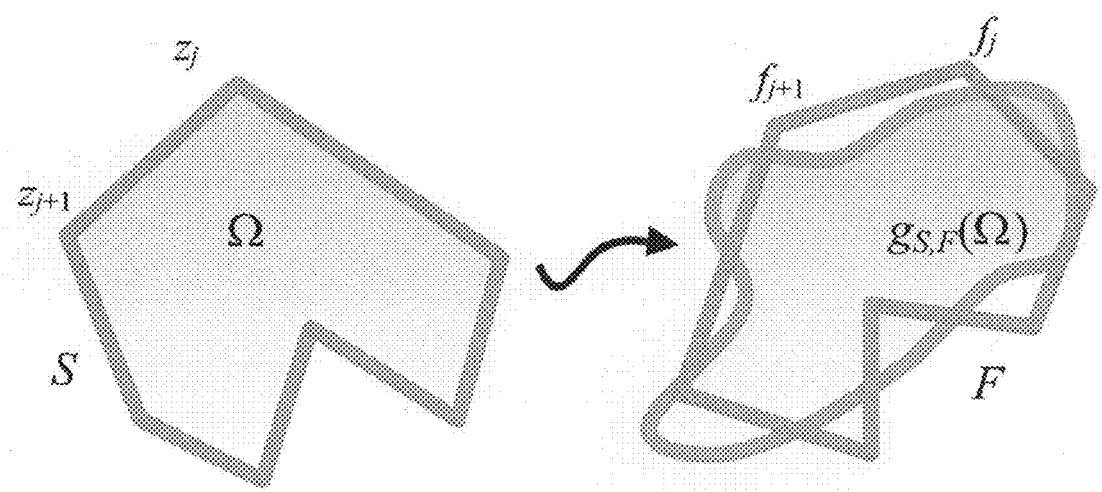
FIG. 2 is a schematic illustration of a polygonal contour that encloses a geometric object $\Omega$, a target polygonal contour, and a deformation of the geometric object which is generated according to the deformation between the contours, according to some embodiments of the present invention.

Then, as shown at 101, a geometric object is enclosed, manually and/or automatically, by a contour. The geometric object optionally encloses a representation of one or more image areas, figures, and/or shapes. Optionally, the data segment is displayed on a display, such as a computer screen, for viewing by a user. The user marks the enclosed geometric object, for example by drawing a contour, or a substantially closed curve, on the data segment. The contour may be drawn using a computer input device, such as a mouse and a touch screen. Optionally, the contour is marked on the source lattice which is superimposed on the data segment. Optionally, the contour is polygonal, for example as shown at FIG. 2. Optionally, a segmentation module is used for automatically identifying an area that is enclosed by a contour. The segmentation is optionally performed using methods and/or systems which are known in the art and therefore not further described herein. For example, a data segment, such as a vector image or a bitmap image, selected and/or uploaded by the user, may be segmented wherein one or more segments is separately processed as depicted in 102-105 and described below.

Optionally, a number of positional constraints, which may be referred to herein as control points, are identified according to the enclosing contour. These control points are designed to facilitate the manipulation of the contour, for example as described below. Optionally, the control points are the vertices of the contour. For example, if the contour is polygonal, the control points are the vertices of the created polygon.

Then, as shown at 102, the user indicates a deformation from the enclosed geometric object to a target geometric object optionally in a target data segment, for example by manipulating the enclosing contour to arrive at a target contour. Optionally, the manipulation is performed by manipulating one or more of the aforementioned control points. In use, relocating these control points allows the user to manipulate the geometric object, for example as described below. The control points may be manipulated sequentially or simultaneously by the user for indicating a requested deformation.

As shown at 104, a plurality of barycentric coordinates are calculated according to the enclosing contour, allowing the calculation of a complex deformation function. Optionally, the complex deformation function is based on complex coefficients, which are generated to provide a conformal mapping from the interior of the enclosing contour into the interior of a target contour, which is optionally defined by the manipulation of 103. The conformal mapping allows generating a new data segment, such as a new image in which the geometric object is deformed to the target geometric object in a target data segment according to the complex deformation function.

As described above, the enclosing contour defines a polygon that encloses the geometric object in the data segment. For clarity, $S=\{v_1, v_2, \ldots, v_n\} \subset R^2$ denotes vertices of a simply connected planar polygon, oriented in the counter clockwise direction, $v_j=(x_j, y_j)$, $\Omega$ denotes the interior of S, and $z_j=x_j+iy_j$ denotes a representation of the vertices as complex numbers, with $i=\sqrt{-1}$, $z_j \in \mathbb{C}$.

Given a point $v=(x, y) \in \Omega$ with a defined $z=x+iy$, the complex deformation function is optionally based on a combination of complex barycentric coordinates, for example as the following linear combination:

$$\sum_{j=1}^{n} k_j(z) z_j \qquad \text{Equation 1}$$

where $k_j(z):\Omega \to \mathbb{C}$ and the following hold for all $z \in \Omega$:

$$\sum_{j=1}^{n} k_j(z) = 1 \qquad \text{Equation 2}$$

$$\sum_{j=1}^{n} k_j(z) z_j = z \qquad \text{Equation 3}$$

Equation 2 is a constant precision condition that implies that the real part of the complex barycentric coordinates sums to 1, and the imaginary part sums to 0, a constant precision that is also known as the "reproduction of unity". Equation 3 is a linear precision, also known as the "reproduction of the identity". It should be noted that the inventors surprisingly discover that deformations and image manipulations made using such complex barycentric coordinates may represent a conformal mapping that preserves fine details and do not contain shear artifacts such as these observed in deformations and image manipulations made according to real barycentric coordinates.

The complex barycentric coordinates $k_j(z)$ for S allows calculating the aforementioned complex deformation function. For clarity, $g_{S,F}(z)$ denotes a complex deformation function which results from applying the complex barycentric coordinates to control points, such as the vertices of a target polygon $F=\{f_1, f_2, \ldots, f_n\} \subset \mathbb{C}$:

$$g_{S,F}(z) = \sum_{j=1}^{n} k_j(z) f_j \qquad \text{Equation 4}$$

It should be noted that F is simply connected and oriented counter-clockwise. An example for the mapping which may be calculated according to the complex deformation function is as shown in FIG. 2, which is a planar mapping from $\Omega$, the interior of the polygon S, to $g_{S,F}(\Omega)$ using complex barycentric coordinates $kj(\Omega)$.

The complex deformation function may be viewed as a planar mapping from $\Omega$, the interior of S, to its image, denoted herein as $g(\Omega)$. It should be noted that $g(\Omega)$ may not be the interior of the polygon F. In addition, since the complex barycentric coordinates reproduce unity and the identity, they may reproduce any linear function of z. A linear function of a single complex variable is equivalent to a similarity 2D transformation in the plane. Thus, the complex barycentric coordinates reproduce similarity transformations. Therefore, if $f_j=f(z_j)$ for some similarity transformation f, then $g_{S,F}=f$. For clarity, although all complex barycentric coordinates reproduce similarity transformations, not all may reproduce affine transformations. In addition, complex barycentric coordinates $k_j(z)$ reproduce affine transformations if and only if the complex conjugates of the coordinates $k_j(z)$ also have linear precision:

$$\sum_{j=1}^{n} \overline{k}_j(z) z_j = z \qquad \text{Equation 5}$$

Optionally, the complex barycentric coordinates are not interpolated, for example for satisfying the LaGrange property of the coordinates, as required from real barycentric coordinates deformation. As the image $g(\Omega)$ is expected to be close in some sense to the target polygon F, a strict interpolation requirement, such as $g(z_j)=f_j$ is not implied. In such an embodiment, a more natural mapping of $\Omega$ is allowed.

Optionally, the complex barycentric coordinates are generalized to continuous contours. For example, $\Omega$ denotes a simply connected open planar region with a smooth boundary S. If $z \in \Omega$ and $w \in S$ the complex coordinate function is $k(w,z)$: $S \times \Omega \to \mathbb{C}$. Analogously to the aforementioned case, $k(w,z)$ is a coordinate function if the Constant and linear precisions in equations 6 and 7 are satisfied for all $z \in \Omega$:

$$\int_S k(w, z) dw = 1 \qquad \text{Equation 6}$$

$$\int_S k(w, z) w dw = z \qquad \text{Equation 7}$$

Optionally, the function $k(w,z)$ is a kernel function. One of the differences between such complex barycentric coordinates and the continuous definition of real barycentric coordinates, for example as described in Belyaev A.: On transfinite barycentric coordinates. Proc. Symp. Geometry Processing (2006), 89-99 and Warren J. D., Schaefer S., Hirani A. N., Desbrun M.: Barycentric coordinates for convex sets. Adv. Comput. Math. 27, 3 (2007), 319-338, which are incorporated herein by reference, is that the integral over S is a complex integral, where $dw=T(w)ds$. $T(w)$ is the unit-length tangent vector to S at w, and ds is the usual arc-length differential element. For example see FIG. 3, which is a Continuous planar mapping from Ω wherein the interior of the closed curve S to $g_{S,f}(\Omega)$ is performed according to a complex kernel $k(S \times \Omega)$.

Analogously to the complex deformation function that is described in equation 4, given a continuous complex function $f(S):S \to \boxtimes$,, we can define a planar mapping $g_{S,f}(\Omega)$ as follows:

$$g_{S,f}(z) = \int_S k(w, z) f(w) dw \quad \text{Equation 8}$$

where the kernels $k(w,z)$, or, in the discrete case, the coordinate functions $k_j(z)$, satisfy the required constant and linear precisions.

According to some embodiments of the present invention, a simple complex kernel is used both in the continuous and discrete settings to obtain useful barycentric coordinates. The simple complex kernel is optionally generalized to a family of discrete complex three-point-coordinates.

It should be noted that the calculation of the plurality of barycentric coordinates based on the enclosing contour may reduce the computational complexity which is required for deforming a geometric object according to user inputs. The calculated barycentric coordinates may be stored and used for mapping the geometric object according to various manipulations of the user. In such a manner, a user that manipulates the contour of the geometric object a plurality of times before selecting a preferred deformation does not incur high computational complexity as the calculation of the complex barycentric coordinates may not be repeated every iteration. For example, in use, the complex barycentric coordinates may be calculated in the first iteration and used for mapping all the deformations which are performed by the user to the geometric object.

Continuous Cauchy Coordinates

Optionally, the simple complex kernel is a Cauchy kernel, see Bell S.-R.: The Cauchy Transform, Potential Theory and Conformal Mapping. CRC-Press, (1992), which is incorporated herein by reference. For example, the Cauchy kernel is defined as follows:

$$C(w, z) = \frac{1}{2\pi i} \frac{1}{w-z} \quad \text{Equation 9}$$

where C is known from the complex analysis of the Cauchy kernel. Optionally, C satisfies the constant and linear precisions as follows:

$$\frac{1}{2\pi i} \int_S \frac{1}{w-z} dw = 1; \quad \frac{1}{2\pi i} \int_S \frac{w}{w-z} dw = z; z \in W \quad \text{Equation 10}$$

as these precisions are special cases, where $h(w)=1$ and $h(w)=w$, of Cauchy's integral formula, such as described in Ahlfors L.: Complex Analysis, 3rd Edition. McGraw-Hill Science, (1979), which is incorporated herein by reference. The Cauchy's integral formula asserts that the values of a function on the boundary of a simply-connected region determine its value at every point inside the region:

$$\frac{1}{2\pi i} \int_S \frac{h(w)}{w-z} dw = h(z) \quad \text{Equation 11}$$

Cauchy's integral formula is based on complex functions known as holomorphic functions which are the linear subspace of complex functions. Each holomorphic function generates a geometric interpretation wherein the first derivative does not vanish is a conformal mapping, see Ahlfors L.: Complex Analysis, 3rd Edition. McGraw-Hill Science, (1979), which is incorporated herein by reference. Briefly stated, the Cauchy kernel reproduces all holomorphic functions. For clarity, the resulting coordinates may be referred to herein as Cauchy coordinates.

Applying the Cauchy coordinates to a target contour $f_{(S)}$ defines the following mapping:

$$g_{S,f}(z) = \frac{1}{2\pi i} \int_S \frac{f(w)}{w-z} dw \quad \text{Equation 12}$$

Note, that Equation 11 and Equation 12 are different, as h in Equation 11 is a holomorphic function defined on S and on the interior of S, Ω, and f in Equation 12 is a function defined only on S.

The mapping of $g(\Omega)$ in Equation 12 may be referred to as a Cauchy transform of f, see Bell S.-R.: The Cauchy Transform, Potential Theory and Conformal Mapping CRC-Press, (1992), which is incorporated herein by reference.

In Cauchy Transform, if f is continuous on S, g is always holomorphic on Ω. Hence, if we apply these coordinates in the context of planar shape deformation, the deformation is guaranteed to be conformal if the derivatives do not vanish. In addition, since holomorphic functions are infinitely differentiable, the mapping is relatively smooth.

Discrete Cauchy-Green Coordinates

As described above, the enclosing contour S, which is provided manually by the user and/or automatically by a segmentation module, as shown at 101, is a polygonal, and may be referred to herein as a cage. As shown at 102, the contour may be manipulated to a new polygon F, for example as shown in FIG. 2. When the mapping of $S=\{z_1, z_2, \ldots, z_n\}$ is performed, according to equation 12, with a polygonal contour, equation 11 may still be valid although S does not have a tangent vector at $z_i$. This may be allowed by applying equation 12 to each edge $e_j=(z_{j-1}, z_j)$ separately, for example as follows:

$$g_{S,f}(z) = \frac{1}{2\pi i} \sum_{j=1}^{n} \int_{e_j} \frac{f(w)}{w-z} dw \quad \text{Equation 13}$$

Since F is also a polygonal, f maps each edge of S linearly to an edge of F. Hence, for $w \in (z_{j-1}, z_j)$:

$$f(w) = f_{j-1} + \frac{(f_j - f_{j-1})(w - z_{j-1})}{(z_j - z_{j-1})} \quad \text{Equation 14}$$

Figure 4:
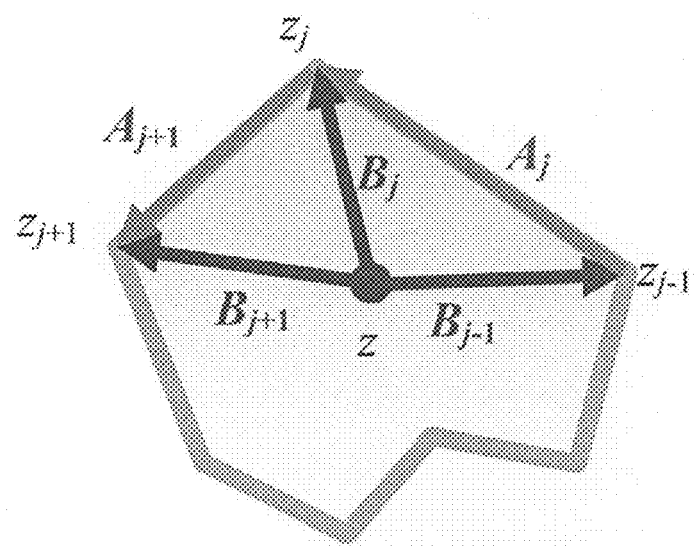
FIG. 4 is a schematic illustration of an arbitrary complex number which is expressed by a complex affine combination of several complex points, according to some embodiments of the present invention.
Figure 5:
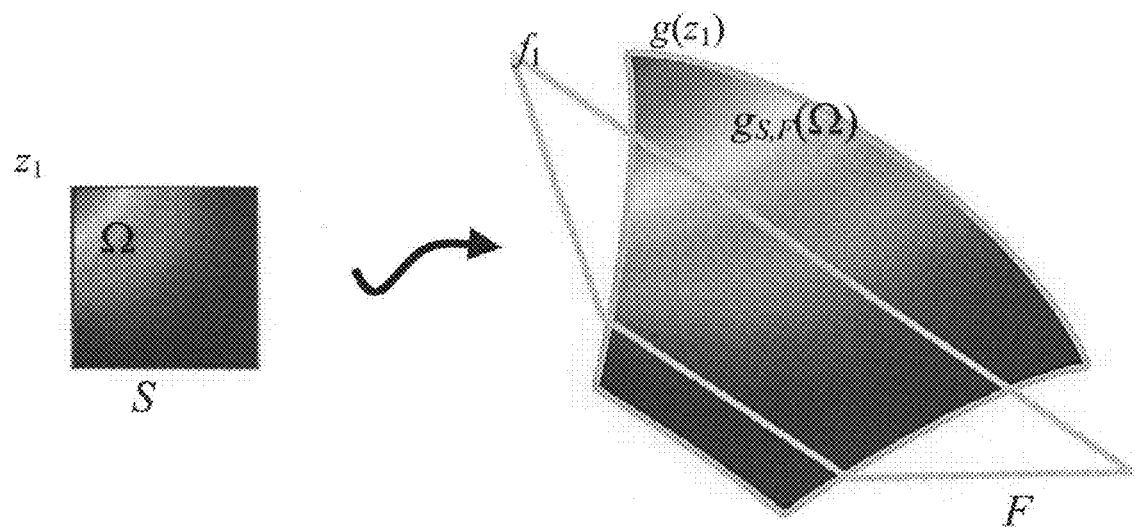
FIG. 5 is a color mapping of a polygon generated by discrete Cauchy coordinates, according to some embodiments of the present invention.

And therefore computing the integral on a single edge $e_j$ may be performed as follows:

$$\int_{e_j} \frac{f(w)}{w-z} dw = \log \frac{B_j(z)}{B_{j-1}(z)} \left( \begin{array}{c} f_{j-1} \frac{B_j(z)}{A_j} - \\ f_i \frac{B_{j-1}(z)}{A_j} \end{array} \right) + f_j - f_{j-1} \qquad \text{Equation 15}$$

where $B_j(z)=z_j-z$ and $A_j=z_j-z_{j-1}$, as in FIG. 4. Summing over all edges, and rearranging the terms yields $C_j(z)$, which may be referred to as discrete Cauchy coordinates, as follows:

$$g_{s,f}(z) = \sum_{j=1}^{n} C_j(z) f_j \qquad \text{Equation 16}$$

$$C_j(z) = \frac{1}{2\pi i} \left( \begin{array}{c} \frac{B_{j+1}(z)}{A_{j+1}} \log\left(\frac{B_{j+1}(z)}{B_j(z)}\right) - \\ \frac{B_{j-1}(z)}{A_j} \log\left(\frac{B_j(z)}{B_{j-1}(z)}\right) \end{array} \right) \quad (8)$$

where g denotes a discrete Cauchy transform of f. For example, FIG. 5 depicts the notation for a discrete Cauchy coordinate.

It should be noted that $C_j(z)$ is defined on the interior of a polygonal contour, as the boundary of the expression may be singular. For example, FIG. 5 depicts a mapping of a polygon generated by the aforementioned discrete Cauchy coordinates. Note that the image of the polygon is not a polygon. The mapping is a linear combination of the n holomorphic coordinate functions $C_j(z)$, one of which is visualized in the figure.

The discrete Cauchy transform has a number of properties. First, similarly to the continuous Cauchy transform, the resulting function g is holomorphic, and infinitely differentiable. Hence, the mapping from $\Omega$ to $g(\Omega)$ is conformal. In addition, as the aforementioned complex deformation functions, it reproduces similarity transformations.

The discrete Cauchy coordinates may be represented as 2D Green coordinates, see Lipman Y., Levin D., Cohen-Or D.: Green coordinates, ACM Trans. Graph. (Proc. SIGGRAPH), 27, 3 (2008), which is incorporated herein by reference. In particular, the 2D Green coordinates are defined as follows:

$$g(\eta) = \sum_{k \in V} \phi_k(\eta) v_k + \sum_{j \in V} \psi_j(\eta) n(t_j) \qquad \text{Equation 17}$$

where $v_k$ and $t_j$ respectively denotes vertices and edges of the cage and $n(t_j)$ denotes an unnormalized normal to a respective edge. The coordinate functions $\phi_k$ and $\psi_j$ are the closed form integrals present in Green's third identity, and have somewhat complicated expressions. Denoting by $z_k$ the complex representation of the cage vertices $v_k$, the following is received:

$$g(\eta) = \sum_{k \in V} \phi_k(\eta) z_k + \sum_{j \in V} \psi_j(\eta) i(z_{j+1} - z_j) \qquad \text{Equation 18}$$

as the unnormalized normal is just the edge rotated by $\pi/2$, which is an equivalent to multiplication of the edge by i in the complex plane. A rearranging of the terms provides the following:

$$g(\eta) = \sum_{j \in V} (\phi_j(\eta) + i(\psi_{j-1}(\eta) - \psi_j(\eta))) z_j \qquad \text{Equation 19}$$

which allows plugging in the formulas for $\phi_j$ and $\psi_j$ given in Lipman Y., Levin D., Cohen-Or D.: Green coordinates, ACM Trans. Graph. (Proc. SIGGRAPH), 27, 3 (2008), which is incorporated herein by reference. The derivation results in the discrete Cauchy coordinates. Thus, the discrete Cauchy coordinates are derived from Cauchy's integral formula, and the Green coordinates are derived from Green's third identity. These are equivalent in the sense that one may be derived from the other, see Ahlfors L.: Complex Analysis, 3rd Edition. McGraw-Hill Science, (1979), which is incorporated herein by reference. For clarity, these coordinates are referred to herein as the Cauchy-Green coordinates.

In the next section, we will consider a general family of complex barycentric coordinates analogous to the "three-point coordinates" family defined in Floater M. S., Hormann K., Kòs G.: A general construction of barycentric coordinates over convex polygons. Adv. Comp. Math. 24, 1-4 (2006), 311-331, which is incorporated herein by reference.

Complex Three-Point Coordinates

Optionally, the Cauchy Green complex barycentric coordinates are defined such that the coordinate $k_j$ depends only on the points $v_{j-1}, v_j, v_{j+1}$, for example in a similar manner to the coordinates described in Floater M. S., Hormann K., Kòs G.: A general construction of barycentric coordinates over convex polygons. Adv. Comp. Math. 24, 1-4 (2006), 311-331, which is incorporated herein by reference. For clarity, $mj(z):\Omega \to \boxtimes$, , j=1, . . . ,n denotes a complex functions, and $B_j(z)= z_j-z$ and $A_j=z_j-z_{j-1}$, are as described in FIG. 4. Then the functions:

$$k_j(z) = m_j(z) \frac{B_{j+1}(z)}{A_{j+1}} - m_{j-1}(z) \frac{B_{j-1}(z)}{A_j} \qquad \text{Equation 20}$$

satisfy:

$$\sum_{j=1}^{n} k_j(z)(z_j - z) = 0 \qquad \text{Equation 21}$$

This may be derived from the determination that an arbitrary complex number z may be expressed uniquely using a complex affine combination of two other points, while an arbitrary 2D vector requires an affine combination of three points. Specifically, given a complex number z, and the complex numbers $z_j$ and $z_{j+1}$, there are complex numbers $\alpha_j(z)$ and $\beta_j(z)$ such that:

$$z=z_j\beta_j(z)+z_{j+1}\alpha_j(z)\alpha_j(z)+\beta_j(z)=1 \qquad \text{Equation 22}$$

$\alpha_j(z)$ and $\beta_j(z)$ may be identified by solving these two linear complex equations in two variables. The solutions are:

$$\alpha_j(z) = \frac{z - z_j}{z_{j+1} - z_j}, \beta_j(z) = \frac{z_{j+1} - z}{z_{j+1} - z_j} \qquad \text{Equation 23}$$

Following Floater M. S., Hormann K., Kòs G.: A general construction of barycentric coordinates over convex polygons. Adv. Comp. Math. 24, 1-4 (2006), 311-331, which is incorporated herein by reference, the following may be concluded:

$$D_j(z)=\beta_j(z)(z_j-z)+\alpha_j(z)(z_{j+1}-z)\equiv 0 \qquad \text{Equation 24}$$

Now, any linear combination of $D_j(z)$ vanishes, hence:

$$\sum_{j=1}^n m_j(z)D_j(z) = 0 \qquad \text{Equation 25}$$

by plugging $\alpha_j(z)$ and $\beta_j(z)$ and rearranging the terms, the following is received:

$$\sum_{j=1}^n \left(m_j(z)\frac{B_{j+1}(z)}{A_{j+1}} - m_{j-1}(z)\frac{B_{j-1}(z)}{A_j}\right)(z_j - z) = 0 \qquad \text{Equation 26}$$

Optionally, the sum of the aforementioned set of functions $k_j(z)$, is non-zero for all z, and therefore the functions $w_j(z)= k_j(z)/\Sigma k_j(z)$ have the constant precision and linear precision properties, and hence are by definition complex barycentric coordinates.

In addition, we can derive that any set of complex functions $k_j(z)$ which satisfy $$\sum_{j=1}^n k_j(z)(z_j - z) = 0 \qquad \text{Equation 27}$$

may be expressed in the form of Equation 26. The family of complex three point coordinates is generated by restricting $m_j(z)$ to be a complex function of only $B_j(z)$ and $B_{j+1}(z)$. Comparing the expression for the discrete Cauchy-Green coordinates from Equation 16 to the expression in Equation 26, we may see that the discrete Cauchy-Green coordinates are members of the complex three-point coordinate family, with the following:

$$m_j(z) = \frac{1}{2\pi i}\log\frac{B_{j+1}(z)}{B_j(z)} = \frac{1}{2\pi i}\int_{z_j}^{z_{j+1}}\frac{1}{w-z}dw \qquad \text{Equation 28}$$

Complex B-Spline Coordinates

Optionally, the contour S can have different geometric representations rather than just being a polygon. For example, the complex barycentric coordinates can be defined based on a B-spline curve. In such an embodiment, the geometric object is enclosed by a B-spline contour, which is optionally approximated from a user input, such as the aforementioned user input.

For the functions for the particular case where the contour is a quadratic B-Spline curve are defined as follows:

$$K_j := \frac{1}{4\pi I}\left(\begin{array}{c} -\frac{\left(2\cdot z0\cdot(A_j - A_{j-1}) + z_{j-2}^2 + 4z_{j-1}^2 - z_jz_{j-1} - 3z_{j-1}z_{j-2} - z_jz_{j-2}\right)\ln\left(\frac{C_{j-1}}{C_j}\right)}{(A_j - A_{j-1})^2} + \\ -\frac{\left(4\cdot z0\cdot(A_{j+1} - A_j) - z_{j-1}^2 - 6z_{j-1}z_{j+1} + 4z_jz_{j-1} - z_{j+1}^2 + 4z_jz_{j+1}\right)\ln\left(\frac{C_j}{C_{j+1}}\right)}{(A_{j+1} - A_j)^2} - \\ \frac{\left(2\cdot z0\cdot(A_{j+2} - A_{j+1}) + z_{j+2}^2 + 4z_{j+1}^2 - z_jz_{j+1} - 3z_{j+1}z_{j+2} - z_jz_{j+2}\right)\ln\left(\frac{C_{j+1}}{C_{j+2}}\right)}{(A_{j+2} - A_{j+1})^2} + \\ \frac{2IA_{j-1}S_{j-1}\ln\left(\frac{2B_{j-1} - IS_{j-1}}{2B_{j-1} + IS_{j-1}}\right)}{(A_j - A_{j-1})^2} - \\ \frac{2I(A_{j+1} + A_j)S_j\ln\left(\frac{2B_j - IS_j}{2B_j + IS_j}\right)}{(A_{j+1} - A_j)^2} + \\ \frac{2IA_{j+2}S_j\ln\left(\frac{2B_{j+1} - IS_{j+1}}{2B_{j+1} + IS_{j+1}}\right)}{(A_{j+2} - A_{j+1})^2} - \frac{3A_{j+2} - A_{j+1}}{A_{j+2} - A_{j+1}} + \\ \frac{2(A_{j+1} + A_j)}{A_{j+1} - A_j} - \frac{3A_{j-1} - A_j}{A_j - A_{j-1}} \end{array}\right)$$

$$\frac{d}{dz0}(K_j) := \frac{1}{4\pi I}\left(\begin{array}{c} \frac{2\ln\left(\frac{C_j}{C_{j-1}}\right)}{A_j - A_{j-1}} - \frac{4\ln\left(\frac{C_{j+1}}{C_j}\right)}{A_{j+1} - A_j} + \frac{2\ln\left(\frac{C_{j+2}}{C_{j+1}}\right)}{A_{j+2} - A_{j+1}} + \\ -\frac{\left(\begin{array}{c}2z0A_j - 2z0A_{j-1} + \\ z_{j-2}^2 + 4z_{j-1}^2 - z_jz_{j-1} - \\ 3z_{j-1}z_{j-2} - z_jz_{j-2}\end{array}\right)(C_j - C_{j-1})}{C_jC_{j-1}(-A_j + A_{j-1})^2} - \\ \frac{\left(\begin{array}{c}4z0A_{j+1} - 4z0A_j - \\ z_{j-1}^2 - 6z_{j-1}z_{j+1} + \\ 4z_jz_{j-1} - z_{j+1}^2 + 4z_jz_{j+1}\end{array}\right)(C_{j+1} - C_j)}{C_{j+1}C_j(A_{j+1} - A_j)^2} + \\ -\frac{\left(\begin{array}{c}2z0A_{j+2} - 2z0A_{j+1} + \\ z_{j+2}^2 + 4z_{j+1}^2 - z_jz_{j+1} - \\ 3z_{j+1}z_{j+2} - z_jz_{j+2}\end{array}\right)(C_{j+2} - C_{j+1})}{C_{j+2}C_{j+1}(A_{j+2} - A_{j+1})^2} - \\ \frac{2I\ln\left(\frac{2B_{j-1} - IS_{j-1}}{2B_{j-1} + IS_{j-1}}\right)A_{j-1}}{(A_j - A_{j-1})S_{j-1}} + \\ \frac{2I\ln\left(\frac{2B_j - IS_j}{2B_j + IS_j}\right)(A_{j+1} + A_j)}{(A_{j+1} - A_j)S_j} - \\ \frac{2I\ln\left(\frac{2B_{j+1} - IS_{j+1}}{2B_{j+1} + IS_{j+1}}\right)A_{j+2}}{(A_{j+2} - A_{j+1})S_{j+1}} + \\ \frac{8(S_{j-1}^2 - A_jB_{j-1} + A_{j-1}B_{j-1})A_{j-1}}{(A_j - A_{j-1})^2(4B_{j-1}^2 + S_{j-1}^2)} - \\ \frac{8(S_j^2 - A_{j+1}B_j + A_jB_j)(A_{j+1} + A_j)}{(A_{j+1} - A_j)^2(4B_j^2 + S_j^2)} + \\ \frac{8(S_{j+1}^2 - A_{j+2}B_{j+1} + A_{j+1}B_{j+1})A_{j+2}}{(A_{j+2} - A_{j+1})^2(4B_{j+1}^2 + S_{j+1}^2)} \end{array}\right)$$

$$\frac{d^2}{dz0^2}(K_j) :=$$

-continued $$\frac{1}{4\pi I}\begin{pmatrix} \frac{-2C_{j-1}+2C_j+A_{j-1}+A_j}{C_{j-1}C_j(A_j-A_{j-1})} + \\ \frac{2(-2C_j+2C_{j+1}+A_{j+1}+A_j)}{C_jC_{j+1}(-A_{j+1}+A_j)} - \\ \frac{-2C_{j+1}+2C_{j+2}+A_{j+1}+A_{j+2}}{C_{j+1}C_{j+2}(-A_{j+2}+A_{j+1})} - \\ \frac{1}{2}\frac{1}{C_j^2C_{j-1}^2(A_j-A_{j-1})^2}\begin{pmatrix}\begin{pmatrix}-2z0A_j+2z0A_{j-1}-\\ z_{j-2}^2-4z_{j-1}^2+z_jz_{j-1}+\\ 3z_{j-1}z_{j-2}+z_jz_{j-2}\end{pmatrix}\\ (A_{j-1}+A_j)(C_{j-1}+C_j)\end{pmatrix} + \\ \frac{1}{2}\frac{1}{C_{j+1}^2C_j^2(A_{j+1}-A_j)^2}\begin{pmatrix}\begin{pmatrix}-4z0A_{j+1}+4z0A_j+\\ z_{j-1}^2+6z_{j-1}z_{j+1}-\\ 4z_jz_{j-1}+z_{j+1}^2-4z_jz_{j+1}\end{pmatrix}\\ (A_{j+1}+A_j)(C_j+C_{j+1})\end{pmatrix} + \\ \frac{1}{2}\frac{1}{C_{j+2}^2C_{j+1}^2(A_{j+2}-A_{j+1})^2}\begin{pmatrix}\begin{pmatrix}2z0A_{j+2}-2z0A_{j+1}+\\ z_{j+2}^2+4z_{j+1}^2-z_jz_{j+1}-\\ 3z_{j+1}z_{j+2}-z_jz_{j+2}\end{pmatrix}\\ (A_{j+1}+A_{j+2})(C_{j+1}+C_{j+2})\end{pmatrix} - \\ \frac{2IA_{j-1}}{S_{j-1}^3}\ln\left(\frac{2B_{j-1}-IS_{j-1}}{2B_{j-1}+IS_{j-1}}\right) + \frac{2I(A_{j+1}+A_j)}{S_j^3}\ln\left(\frac{2B_j-IS_j}{2B_j+IS_j}\right) - \\ \frac{2IA_{j+2}}{S_{j+1}^3}\ln\left(\frac{2B_{j+1}-IS_{j+1}}{2B_{j+1}+IS_{j+1}}\right) + \\ \frac{8(2S_{j-1}^2+A_{j-1}B_{j-1}-A_jB_{j-1})A_{j-1}}{(A_j-A_{j-1})S_{j-1}^2(-4B_{j-1}^2-S_{j-1}^2)} + \\ \frac{8(A_{j+2}B_{j+1}-A_{j+1}B_{j+1}-2S_{j+1}^2)A_{j+2}}{(A_{j+2}-A_{j+1})S_{j+1}^2(4B_{j+1}^2+S_{j+1}^2)} + \\ \frac{8(-A_{j+1}B_j+A_jB_j+2S_j^2)(A_{j+1}+A_j)}{(-A_{j+1}+A_j)S_j^2(-4B_j^2-S_j^2)} - \\ \frac{8\begin{pmatrix}S_{j-1}^2-A_jB_{j-1}+\\ A_{j-1}B_{j-1}\end{pmatrix}A_{j-1}(-8B_{j-1}-2A_j+2A_{j-1})}{(A_j-A_{j-1})^2(4B_{j-1}^2+S_{j-1}^2)^2} + \\ \frac{8\begin{pmatrix}S_j^2-A_{j+1}B_j+\\ A_jB_j\end{pmatrix}(A_{j+1}+A_j)(-8B_j-2A_{j+1}+2A_j)}{(A_{j+1}-A_j)^2(4B_j^2+S_j^2)^2} - \\ \frac{8\begin{pmatrix}S_{j+1}^2-A_{j+2}B_{j+1}+\\ A_{j+1}B_{j+1}\end{pmatrix}A_{j+2}(-8B_{j+1}-2A_{j+2}+2A_{j+1})}{(A_{j+2}-A_{j+1})^2(4B_{j+1}^2+S_{j+1}^2)^2} \end{pmatrix}$$

Optionally, the complex barycentric coordinates are calculated for other contours that may be represented with Bezier curves, NURBS curves, and subdivision curves.

Cauchy-Type Coordinates and Shape Deformation

Optionally, the complex barycentric coordinates are defined to perform a planar shape deformation between the geometric object and a target geometric object in a target data segment with a mapping that runs interactively and preserves as much as possible the details of the shape or image.

Optionally, the data segment, which is received in 100, is a planar mesh or an image. As described above, the user draws a cage around the shape of interest, and modifies the shape by deforming the cage.

It should be noted that the computational complexity for computing a single point in the deformed domain depends on the complexity of the cage that is usually significantly smaller than the complexity of the deformed shape.

In general, there is not exists a conformal mapping which maps the edges of one arbitrary polygon with corresponding vertices linearly to another arbitrary polygon. Thus, the interpolation requirement has to be relaxed. As, the space of conformal mappings from a source polygon to a region in proximity to a target polygon may be relativity large, a requirement to find complex barycentric coordinate functions which give a conformal mapping and minimizes a functional is provided.

Figure 3:
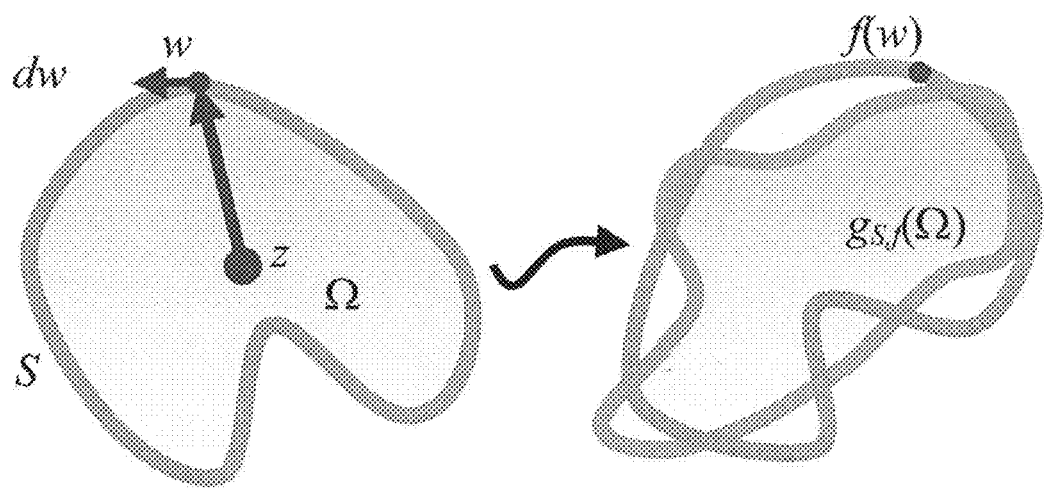
FIG. 3 is a schematic illustration of a continuous planar mapping from geometric object $\Omega$ to a target geometric object in a target image according to a complex area kernel, according to some embodiments of the present invention.

As described above, a Cauchy transform takes a continuous function f on a contour S as input, and outputs g, a holomorphic function on the interior of S, for example as described in FIG. 3.

If f is holomorphic on S∪Ω, then g=f on Ω, the Cauchy transform may also be interpreted as a projection from the linear subspace of continuous functions on S, to the linear subspace of holomorphic functions on Ω.

According to some embodiments of the present invention, a set of complex numbers $u_1, \ldots, u_n$ that minimizes a functional $E_S(g)$ defined on holomorphic functions g: Ω∪S→☒, when respectively multiplied with the discrete Cauchy coordinates is identified such that:

$$g_u(z) = \sum_{j=1}^n C_j(z)u_j \qquad \text{Equation 29}$$

for a source polygon S with n vertices and interior Ω.

Reference is now made to a functional E that may be applied to achieve useful effects in the context of planar shape deformation.

As described in 103, the user manipulates the contour that encloses the geometric object to arrive at a target contour, for example by manipulating one or more control points, such as vertices of an enclosing contour, for example as shown in FIG. 2. The correspondence between the contour that encloses the geometric object and the target contour defines a requested shape deformation. As shown at 103, complex barycentric coordinates are calculated according to the enclosing contour and allows, when applied to the target contour, deforming the enclosed geometric object.

Optionally, the complex deformation function, which is calculated according to the complex barycentric coordinates, defines a non Euclidean mapping in which each point in the boundaries of the geometric object, for example from the continuous points of the source lattice that is superimposed on the data segment, is mapped according to the non Euclidean distance, thereof from one or more of the manipulated vertices. As used herein, a non Euclidean distance means a distance confined to boundaries, such as an enclosing contour, of a surface between two points. In such a manner, a manipulation of a certain vertex may not affect points which are positioned in certain Euclidean distance therefrom more than it affects points which are positioned in a larger Euclidean distance therefrom and undesired shape deformation may be avoided. For example, if the contour of the shape crosses the Euclidean distance between the manipulated vertex and the points, an unrealistic deformation of the shape may be formed. For example, if the shape is a human shape and the manipulated vertex is located at the tip of a limb that is located in a proximity to areas depicting the main body in the original shape, the manipulation may incur an unrealistic movement of the areas in the manipulation direction. By mapping points according to the geodesic distance from the manipulated vertices, the undesired shape deformation is avoided or reduced. Optionally, the mapping according to the geodesic distance is allowed by defining the complex barycentric coordinates such as Szegö barycentric coordinates, for example as described below.

Optionally, the affect of manipulating the vertex on points of the shape is weighted according to the geodesic and/or Euclidean distance of the point from the manipulated vertex. In such a manner, the manipulation of a certain vertex may have a larger effect on pixels which proximate thereto than on pixels which relatively remote therefrom. For example, the influence of a coordinate function that is associated with a manipulated vertex may be local in the sense that it affects only the areas of the cage which are geodesically close to the manipulated vertex. In such a manner, manipulating a control point, such as a vertex, at one section of the shape does not affect another section of the shape, even if the Euclidean distance between them is relatively small.

Szegö Coordinates

As described above, the resulting deformation of the Cauchy-Green coordinates is far from the target cage, see for example FIG. 5. Optionally, in order to improve the fit of the deformation to the target cage the following functional is defined:

$$E_S^{Szeg\ddot{o}}(g) = \int_S |g(w) - f(w)|^2 ds \qquad \text{Equation 30}$$

where f denotes a continuous complex function on a source polygon S.

Optionally, Equation 30 is minimized within the Cauchy-Green subspace, by finding a virtual polygon, such as the aforementioned set of complex numbers $u_1, \ldots, u_n$.

Optionally, the boundary values of the transformation image are acquired. For example, the values of the coordinate functions on S are limited when approaching the boundary from the interior $\Omega$:

$$C_j(z) = \lim_{z^{in} \to z} C_j(z^{in}), \; z^{in} \in \Omega, \; z \in S \qquad \text{Equation 31}$$

For example using the following discrete Cauchy coordinates on the polygon S:

Having defined $C_j$ also on S, Equation 30 may be defined as follows:

$$E_S^{Szeg\ddot{o}}(g) = \int_S |g(w) - f(w)|^2 ds \qquad \text{Equation 33}$$

$$= \int_S \left| \sum_{j=1}^n C_j(w)u_j - f(w) \right|^2 ds$$

Optionally, the integral is approximated as a sum over a k-sampling of S. This sample may be expressed as a product of the n-vector z of the vertices of S with a k×n sampling matrix H, such that w=Hz is a complex k-vector of points sampled on the polygon S. Now $C_j(w)$, f(w) are also complex k-vectors, by evaluating the respective function at the entries of w. The respective function may express the functional in a matrix form, for example as follows:

$$E_S^{Szeg\ddot{o}}(g) = \|Cu - f_s\|_2^2 \qquad \text{Equation 34}$$

where C denotes a k×n matrix having $C_j(w)$ columns, which are the values of the Cauchy-Green coordinate function on the sampled boundary, u denotes an n-vector and $f_s$ denotes a k-vector whose entries are f(w). This equation is optionally solved as a simple linear least-squares problem over the complex numbers:

$$u^{Szeg\ddot{o}} = C^+ f_s = (C^*C)^{-1} C^* f_s \qquad \text{Equation 35}$$

where $C^+$ is the pseudo-inverse of C and $C^*$ is the conjugate transpose of C, see Björk A.: Numerical Methods for Least Squares Problems. SIAM, (1996), which is incorporated herein by reference. The size of the matrix $C^*C$ may be referred to herein as n×n, where n is the number of the vertices of the polygon S, hence such a computation involves the inversion of a relatively modest sized matrix, for example 500×500 matrix. Now, after the virtual polygon $u^{Szeg\ddot{o}}$ is defined, the deformation of an interior point $z \in \Omega$ may be defined as follows:

$$g^{Szeg\ddot{o}}(z) = \sum_{j=1}^n C_j(z) u_j^{Szeg\ddot{o}} \qquad \text{Equation 36}$$

Figure 6:
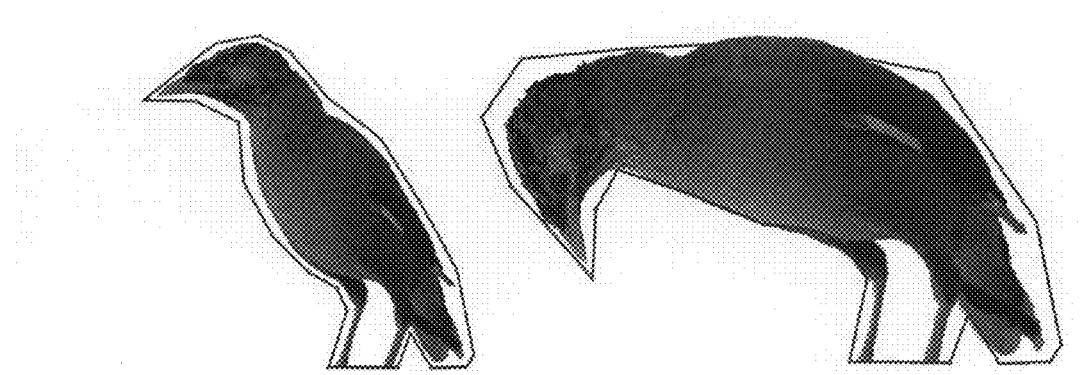
FIG. 6 is an exemplary conformal mapping that is performed by applying Szegö coordinates for deforming a geometric object by mapping a cage with 21 vertices to a target geometric object.

For example, FIG. 6 depicts an exemplary conformal mapping that is performed by applying Szegö coordinates for mapping a deformed cage with 21 vertices. As shown in the figure, the deformed shape remains enclosed in the target cage.

$$C_j(z) = \frac{1}{2\pi i} \begin{cases} \frac{B_{j+1}(z)}{A_{j+1}} \log\left(\frac{B_{j+1}(z)}{B_j(z)}\right) - \frac{B_{j-1}(z)}{A_j} \log\left(\frac{B_j(z)}{B_{j-1}(z)}\right) & z \notin \{e_j, e_{j+1}\} \\ \left(1 + \frac{(1-t)A_j}{A_{j+1}}\right) \log\left(1 + \frac{A_{j+1}}{(1-t)A_j}\right) + t\left(\log\frac{1-t}{t} + \pi i\right) & z \in e_j \Rightarrow z = z_{j-1}(1-t) + z_j t, \; t \in (0,1) \\ (1-t)\left(\log\frac{1-t}{t} + \pi i\right) - \left(1 + \frac{t \cdot A_{j+1}}{A_j}\right) \log\left(1 + \frac{A_j}{t \cdot A_{j+1}}\right) & z \in e_{j+1} \Rightarrow z = z_j(1-t) + z_{j+1} t, \; t \in (0,1) \end{cases} \qquad \text{Equation 32}$$

$$C_j(z) = \frac{1}{2\pi i} \begin{cases} M_j \log N_j & z = z_{j-1} \\ \log \frac{-A_{j+1}}{A_j} & z = z_j \\ N_j \log M_j & z = z_{j+1} \end{cases}, \quad M_j = 1 + \frac{A_j}{A_{j+1}} \\ N_j = 1 + \frac{A_{j+1}}{A_j}$$

Optionally, if the target function f is itself a polygon F, the computational complexity of the deformation of Equation 36 is reduced by formulating the mapping with barycentric coordinates applied to F. In such a manner, the computing of the virtual polygon $u^{Szeg\ddot{o}}$ every time the user modifies the target function f is avoided. For example, if $F=\{f_1, f_2, \ldots, f_n\}$ denotes the target polygon, then its sampled version $f_s$ may be obtained using the sampling matrix H: $f_s$=HF and the following is fulfilled:

$$u^{Szeg\ddot{o}}=C^+HF \quad \text{Equation 37}$$

Figure 7:
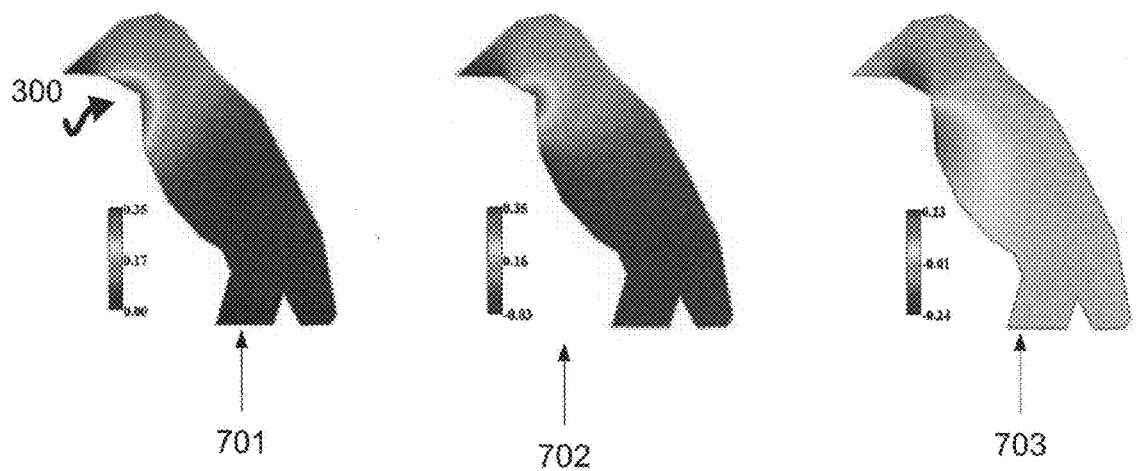
FIG. 7 depicts absolute, real and imaginary color coding of a Szegö coordinate from FIG. 6, according to some embodiments of the present invention.

Thus, the deformation $g_{S,f}$ is defined in terms of the discrete Szegö coordinates Gj(z) of an interior point $z\epsilon\Omega$:

$$g_{S,f}(z) = \sum_{j=1}^{n} G_j(z)f_j \quad \text{Equation 38}$$

$$G_j(z) = \sum_{k=1}^{n} C_k(z)M_{k,j}, M = C^+H$$

where M is an n×n matrix, referred to herein as the Szegö correction matrix. It depends only on the source polygon S, thus may be computed once. For example, FIG. 7 depicts absolute 701, real 702, and imaginary 703 color coding of the real and imaginary parts of the one of the Szegö coordinates from FIG. 6 where absolute, real and imaginary component values of the Szegö coordinate function of a marked point 300 are depicted respectively from left to right. It should be noted that the real part is centered at the vertex and the imaginary part is centered at two adjacent edges. It should be noted that M's rows sum to unity and Mz=z where z is a complex n-vector of the vertices of S. This implies that the Szegö coordinates also have constant and linear precision. Note that each Szegö coordinate function is a linear combination of all the Cauchy-Green coordinate functions.

Point-to-Point Cauchy Coordinates

Figure 8:
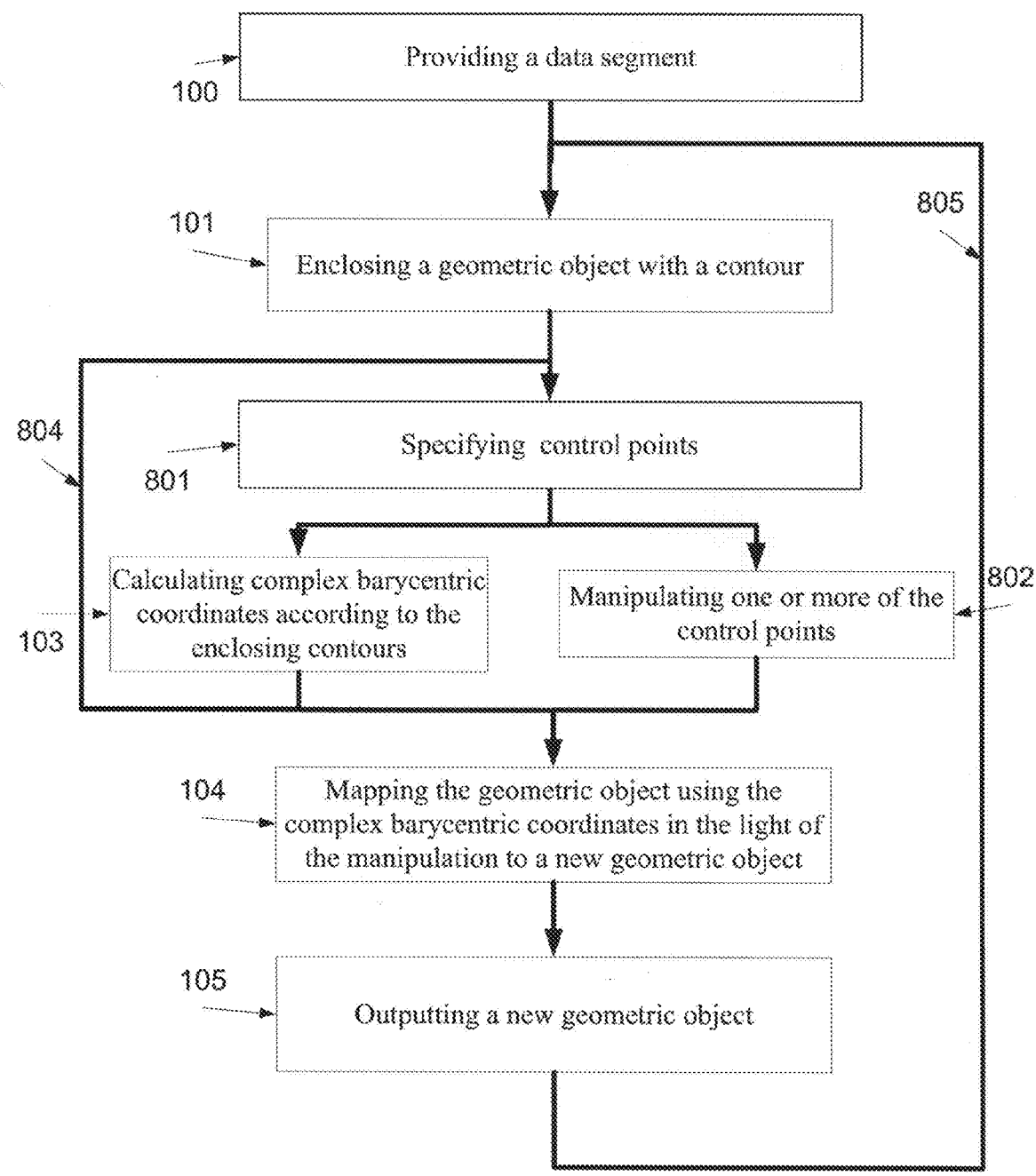
FIG. 8 is a flowchart of a method of deforming an area, according to some embodiments of the present invention.

Reference is now made to FIG. 8, which is a flowchart of a method of deforming an area, according to some embodiments of the present invention. Blocks 100-101 and 104-105 are as described in FIG. 1. However, FIG. 8 further depicts blocks 801-803 in which a set of control points, which are optionally not on the enclosed contour, is identified. The manipulation of one or more of the control points allows the user to indicate a requested deformation of the enclosed geometric object, for example as described below.

As described above, complex barycentric coordinates may allow geometric object deformations based on a manipulation of control points on the contours, such as vertices. The user modifies the location of the target cage vertices and thus controls the deformation. However, if the cage is a complicated geometric figure that contains dozens or hundreds of vertices, modifying each vertex independently to form the new cage is a time-consuming and unintuitive operation.

Optionally, as shown at 801, a limited number of control points are specified, for example 5, 10, 15, 20, 25, 50, and 100 or any intermediate number. The control points are optionally specified manually by the user and/or automatically by a segmentation module. As shown at 103, similarly to the described above, these control points allow calculating complex barycentric coordinates. Optionally, the user changes the control points during the image deformation process, for example as shown at 804. In such an embodiment, the complex barycentric coordinates are recalculated in order to take into account the new control points.

As shown at 802, these positional constraints are optionally manipulated for deforming the area to a target geometric object in a target data segment. The manipulation of the limited number of positional constraints is much more intuitive for a user. In such a manner, the tedious task of manually repositioning cage vertices is replaced by repositioning the limited number of positional constraints which derives suitable cage vertex positions automatically. As shown at 803, the manipulation of the control points allows calculating the complex deformation function, for example similarly to the described above.

Now, as shown at 104 and similarly to the described above, each point in the geometric object is mapped using the complex barycentric coordinates in the light of the manipulation. As the number of control points is typically much smaller than the number of cage vertices, it is possible to use the extra degrees of freedom to regularize the deformation. This means minimizing some aggregate differential quantity. Luckily, the Cauchy-Green coordinates have very simple derivatives and, like the transform itself, may be a complex linear combination of the cage vertices. Hence, a functional combining of positional constraints inside the cage and derivatives on the boundary of the cage may be combined.

For clarity, f denotes a mapping from a set of p points $r_1, r_2, \ldots, r_p \epsilon \Omega$, to the complex plane C, such that $f(r_k)=f_k$, where the following functionals are defined:

$$E_S^{smooth}(g) = \int_S |g''(w)|^2 ds, \quad \text{Equation 39}$$

$$E_S^{Pts}(g) = \sum_{k=1}^{p} |g(r_k) - f_k|^2$$

Optionally, the first functional is minimized, for example by mapping g to be as smooth as possible on the boundary of the cage.

Optionally, the second functional is minimized, for example by imposing a finite set of positional constraints on the deformation in the interior of S.

For example, the following combined weighted functional is defined:

$$E_S^{PtoP}(g)=E_S^{Pts}(g)+\lambda^2 E_S^{Smooth}(g) \quad \text{Equation 40}$$

for a real $\lambda$ where a source polygon S with n vertices and interior $\Omega$, and a functional $E_S^{PtoP}(g)$ is defined on holomorphic functions g: $\Omega\cup S\rightarrow \boxtimes$, find complex numbers $z_1, \ldots, z_n$ such that the second derivative of the discrete Cauchy-Green transform, which is described in equation, using linearity rules, is:

$$g''(z) = \sum_{j=1}^{n} d_j(z)z_j \quad \text{Equation 41}$$

where $$d_j(z) = \frac{1}{2\pi i}\left(\frac{1}{B_{j-1}(z)B_j(z)} - \frac{1}{B_j(z)B_{j+1}(z)}\right) \quad \text{Equation 42}$$

As defined for the aforementioned discrete Szegö coordinates.

Optionally, $E_S^{Smooth}$ is defined on the boundary of $\Omega$, where $d_j$ is singular when z is on the edge $e_j=(z_{j-1}, z_j)$, or on the edge $e_{j+1}=(z_j, z_{j+1})$ where the limit of $d_j$ for is defined as follows:

$$d_j(z) = \lim_{z^{in} \to z} d_j(z^{in}), z^{in} \in \Omega, z \in S \quad \text{Equation 43}$$

for limiting $d_j$ except at the vertices which are equal to $d_j(z)$. Hence, Equation 42 is used as follows:

$$E_S^{smooth}(g) = \int_S |g''(w)|^2 \, ds = \int_S \left| \sum_{j=1}^n d_j(w) u_j \right|^2 ds \quad \text{Equation 44}$$

Optionally, the combined functional is defined as a matrix, for example as follows:

$$E_S^{PtoP}(g) = \|Cu-f\|_2^2 + \lambda^2 \|Du\|_2^2 \quad \text{Equation 45}$$

where D denotes a k×n matrix whose columns are $d_j(w)$, C denotes a p×n matrix whose (i,j) entry is $C_j(r_i)$, u denotes a complex n-vector, and f denotes a complex k-vector whose entries are the positional constraints $f_k$. This allows defining a limited number of complex barycentric coordinates, referred to herein as a point-to-point (P2P) Cauchy-Green barycentric coordinates:

$$g_{s,f}(z) = \sum_{j=1}^p P_j(z) f_j \quad \text{Equation 46}$$

$$P_j(z) = \sum_{k=1}^n C_k(z) N_{k,j},$$

$$N = \left( A^* = \binom{C}{\lambda D} \right)^+_{1 \ldots p}$$

where $P_j$ denotes p barycentric coordinate functions, A*A denotes an n×n invertible matrix, and N denotes the n×p matrix consisting of the first p columns of $A^+$. It should be noted that Using properties of N, it may be shown that the point-to-point Cauchy-Green coordinates have constant and linear precisions. As shown at 105, a new image that depicts the deformed geometric object may be outputted and displayed to the user.

The deformation process depicted in FIG. 8, and similarly in FIG. 1, may be repeated a plurality of times, for example for creating an animation clip in which the geometric object is sequentially deformed for emulating a movement. Optionally, the deformed geometric object may be automatically enclosed by the manipulated target contour in some or all iterations after the first iteration, for example as shown at 805. In order to avoid a cumulative error due to a repeating manipulation of the geometric object, the user manipulates a geometric object from the original data segment to create sequential images for animation.

Figure 9:
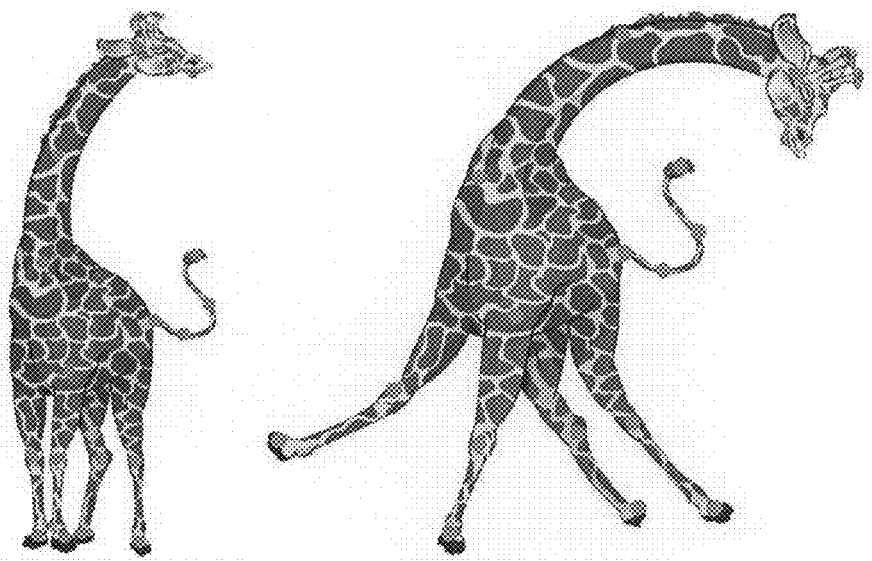
FIG. 9 is a graphic illustration of an exemplary shape that is deformed according to mapping which is based on point-to-point Cauchy-Green coordinates, according to some embodiments of the present invention.

For example, FIG. 9 depicts an exemplary shape that is deformed according to the mapping of the aforementioned Point-to-point Cauchy-Green coordinates. In this example, the mapping is performed according to 16 control points, which are based on a cage with 113 vertices. As described above, the deformation is conformal.

In such an embodiment, the number of coordinate functions $P_j$ is p, the number of control points, rather than n, the number of cage vertices. Thus, the computational complexity of the process is reduced.

Figure 10:
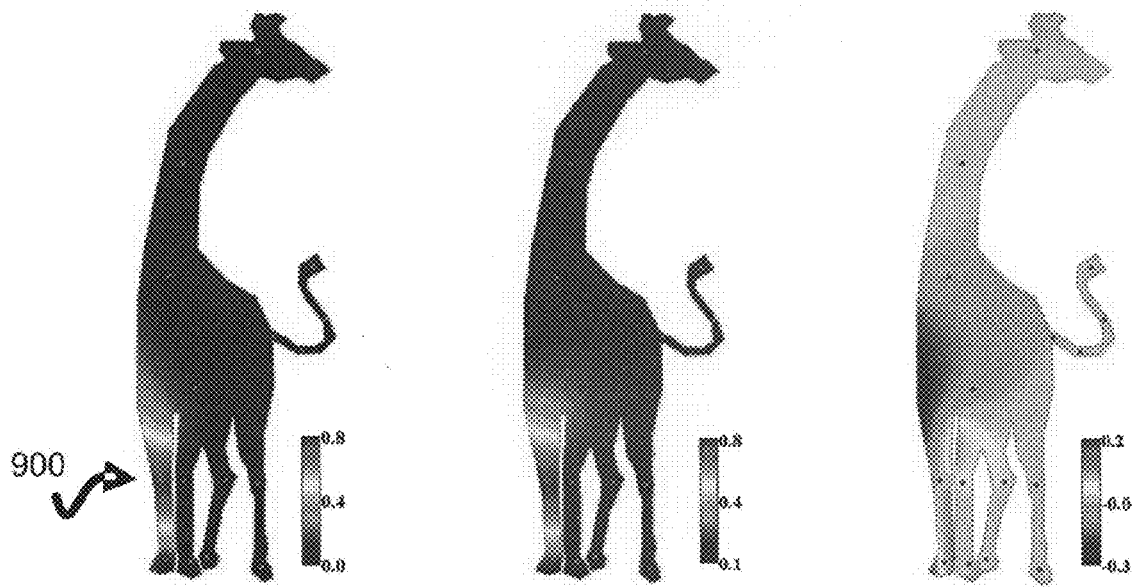
FIG. 10 depicts absolute, real and imaginary color coding of a Cauchy-Green coordinate from FIG. 9, according to some embodiments of the present invention.

FIG. 10 shows the color-coded values of one of the coordinate functions of the shape of FIG. 9. As with the aforementioned Szegö coordinates, the influence of a coordinate function that is associated with a specific control point is local in the sense that it affects only the areas of the cage which are geodesically close to it. This property guarantees that modifying one part of the shape does not affect another part, even if the Euclidean distance between them is small.

Figure 17:
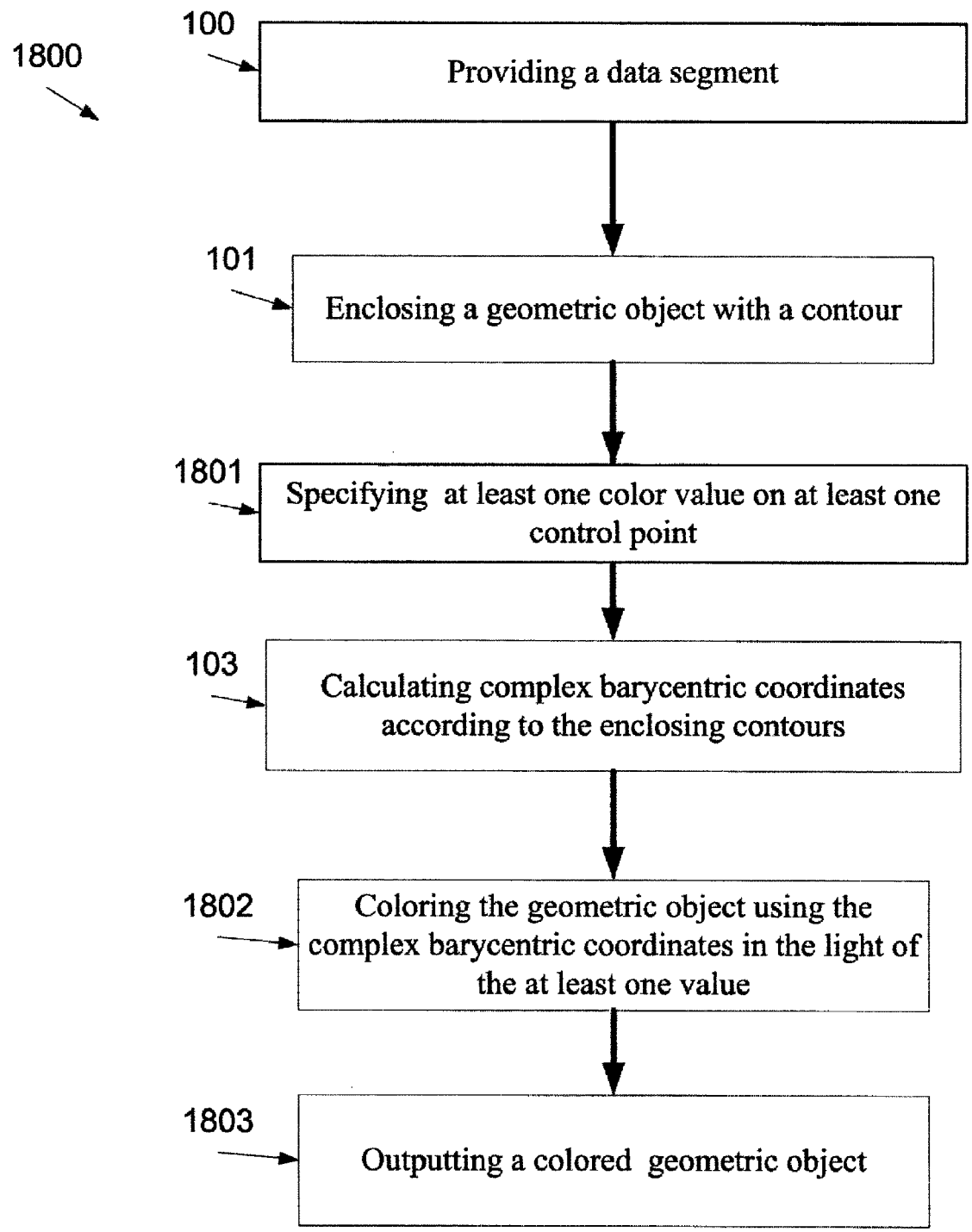
FIG. 17 is a flowchart of a method for coloring a geometric object using complex barycentric coordinates, according to some embodiments of the present invention.

Reference is now made to FIG. 17, which is a flowchart of a method for coloring a geometric object using complex barycentric coordinates, such as any of the above defined complex barycentric coordinates, according to some embodiments of the present invention. Blocks 100, 101, and 103 are as described in FIGS. 1 and 8. However, FIG. 17 further describes a number of logical stages. As depicted in 100 and 101 and similarly to the described above a data segment is provided and a geometric object, which is represented therein, is enclosed in a contour, such as a polygonal or a B-Spline contour. For example, the data segment is an image source that is presented to the user and allows her to mark a contour around a geometric object. Optionally, a color value is defined to each point in the boundaries which are defined by the contour. Optionally, the color value is determined according to a hue, saturation, value (HSV) model. As the barycentric coordinates are complex, the combination of the hue and saturation values is optionally represented as a complex value.

As shown at 1801, the user specifies one or more color values for one or more control points. For example, the color values may be defined at vertices of polygonal contour. Optionally, each control point is updated with Hue and the Saturation components.

As shown at 103, and similarly to the described above, complex barycentric coordinates are calculated in the light of the contour that encloses the geometric object and the one or more control points which are defined by it. For clarity, any of the abovementioned complex barycentric coordinates, for example Szego barycentric coordinates or P2P complex barycentric coordinates may be calculated.

Now, as shown at 1802, the geometric object is colored using the complex barycentric coordinates, in the light of the color values which are defined in the control points. For example, the complex representation of the combination between the hue and the saturation, in some or all the points in the boundaries of the contour, is automatically calculated and/or recalculated according to the color values which are specified or respecified in the control points.

Optionally, the method described in FIG. 17 is used for recoloring an image and/or adjusting the color of an image. In such an embodiment, the provided data segment is an uploaded image. The contour is enclosed on one or more objects in the scene depicted in the image. Now, by specifying color values on a control point, the user may change the saturation of a specific part in the image that is proximate, for example in a non Euclidean distance, thereto.

Optionally, the control points are selected by the user, for example as described above. In such an embodiment, the user may add P2P control points at any segment of the presented image, for example at the legs of a human character which is depicted in the image.

Optionally, the user defines a requested change in one or more of the control points. In such an embodiment, the data at the control points that is interpolated is not the color itself but rather a change that the user wishes to apply. For example, if the geometric object represents a human shape, the user may add a control point at each leg tip and then set a color change, for example (0, 0) color change at the left control point and (1.1, 2.5) at the right control point. Then, a color change is calculated at each point of the geometric object according to the complex barycentric coordinates and applied as described above.

Figure 18:
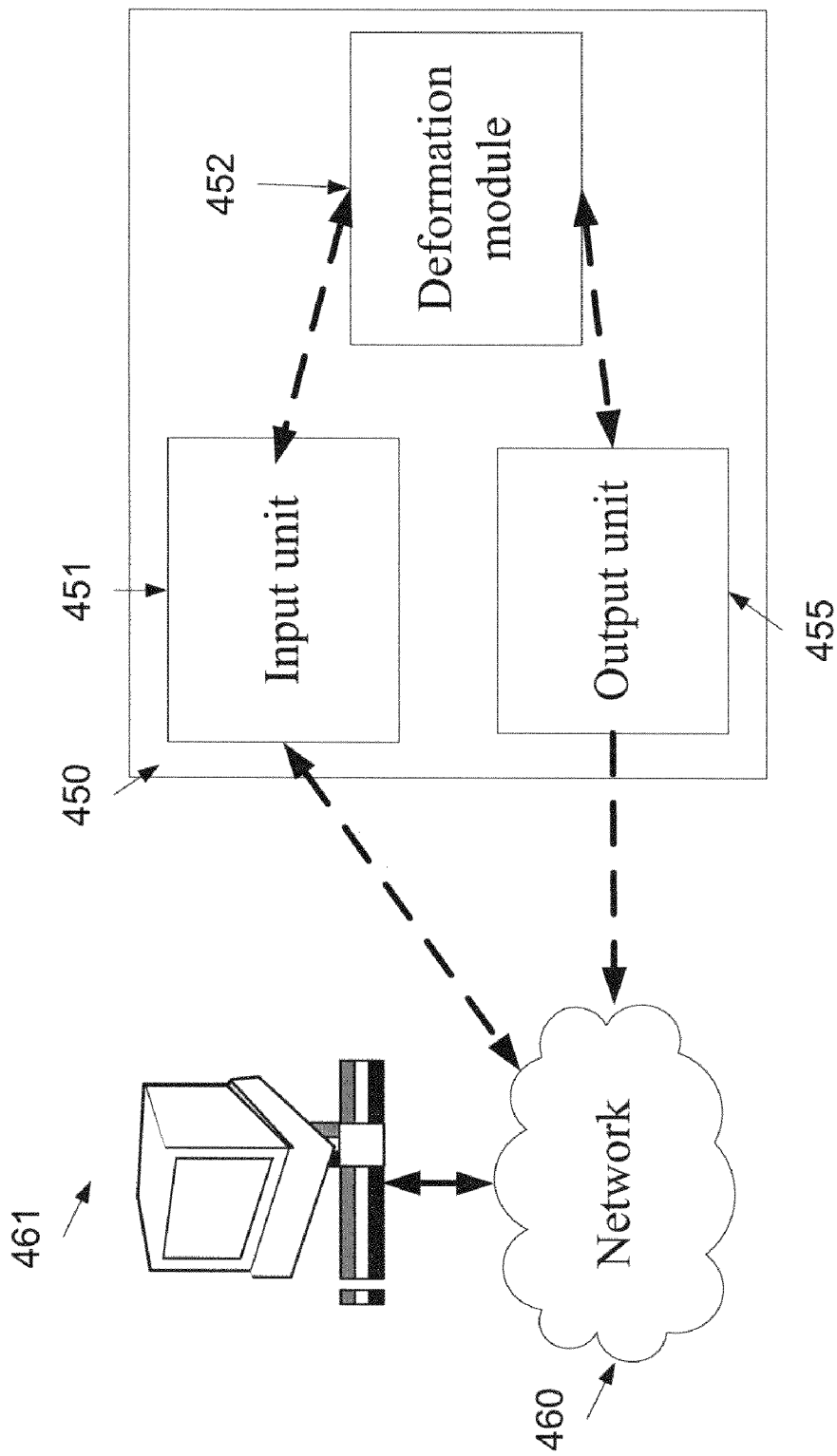
FIG. 18 is a schematic illustration of a system for deforming an image, according to some embodiments of the present invention.

Reference is now made to FIG. 18, which is a system 450 for deforming an image, according to some embodiments of the present invention. The system 450 comprises an input unit 451 configured for receiving a data segment and an input which is indicative of a contour enclosing a geometric object in the data segment. The input may be received from a segmentation module and/or from a user input device. The input unit may comprise a network interface, allowing the reception of the image from a remote client terminal 461, for example over a network 460, such as the internet. The input unit is also configured from receiving a manipulation of the enclosing contour by a user, for example from a user input, such as a mouse and a touch screen. The manipulated contour may be referred to herein as a target contour. The system 450 further comprises a deformation module 452 for calculating a complex deformation function, for example as described above. The deformation module 452 is used for deforming the geometric object according to the calculated complex deformation function, generating a new image that depicts the deformed geometric object. The system further comprises an output module 455 for outputting the new image. The outputted new image may be forwarded to a display and presented to the user.

It should be noted that the input and output module, together with the deformation module 452, may be hosted in the memory of a client terminal such as a computing unit, for example a personal computer, a Smartphone, and a Personal digital assistance (PDA). For example, such a computing system comprises a central processing unit (CPU), a random access memory (RAM), a read only memory (ROM) and an I/O controller coupled by a CPU bus. The I/O controller is also coupled by an I/O bus to input devices such as a keyboard and a mouse, and output devices such as a monitor. The I/O controller also drives an I/O interface that in turn controls a storage device such as a flash memory device and a digital media reader, among others.

It is expected that during the life of a patent maturing from this application many relevant systems and methods will be developed and the scope of the term image, geometric object, manipulating, and segmenting is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Reference is now made to a number of exemplary theorems and derivatives which are based on the aforementioned complex barycentric coordinates.

Complex Barycentric Coordinates—Similarity Reproduction

Theorem 1: Complex barycentric coordinates $k_j(z)$ reproduce similarity transformations, for example:

$$\sum_{j=1}^{n} k_j(z)T(z_j) = T(z)$$

where T is a 2D similarity transformation.

Proof:

Similarity transformations can be represented using a linear polynomial over the complex plane in the following way. If the similarity transformation T consists of rotation by positive angle θ, uniform scale s and a translation $t=t_x+it_y$, then according to the rules of complex numbers:

$$T(x+iy)=T(z)=se^{i\theta}z+t=\alpha z+\beta$$

where α and β are complex numbers. Since complex barycentric coordinates reproduce linear and constant functions by definition, the following is received:

$$\sum_{j=1}^{n} k_j(z)T(z_j) = \sum_{j=1}^{n} k_j(z)(\alpha z_j + \beta)$$

$$= \alpha \sum_{j=1}^{n} k_j(z)z_j + \beta \sum_{j=1}^{n} k_j(z)$$

$$= \alpha z + \beta$$

$$= T(z)$$

Complex Barycentric Coordinates—Affine Reproduction

Theorem 2: Complex barycentric coordinates $k_j(z)$ reproduce affine transformations of $z_j$ which contain non-uniform scale if and only if the complex conjugates of the coordinates $k_j(z)$ also have linear precision, meaning:

$$\sum_{j=1}^{n} \overline{k}_j(z)z_j = z \qquad (1)$$

Proof:
Let T be a 2D transformation which scales the x and y axes non-uniformly:

$$T = \begin{pmatrix} 2\alpha & 0 \\ 0 & 2\beta \end{pmatrix}, \alpha \neq \beta, \alpha, \beta \in R$$

When applied to complex numbers, T can be described as:

$$T(z) = T(x+iy) = 2\alpha x + i2\beta y = \alpha(z+\overline{z}) + \beta(z-\overline{z})$$

To show that the transform reproduces affine transformations the following is proved:

$$\sum_{j=1}^{n} k_j(z)(T(z_j)) = T(z)$$

$$\sum_{j=1}^{n} k_j(z)(\alpha(z_j + \overline{z}_j) + \beta(z_j - \overline{z}_j)) = T(z)$$

$$(\alpha + \beta)\sum_{j=1}^{n} k_j(z)z_j + (\alpha - \beta)\sum_{j=1}^{n} k_j(z)\overline{z}_j = \alpha(z+\overline{z}) + \beta(z-\overline{z})$$

$$(\alpha + \beta)z + (\alpha - \beta)\sum_{j=1}^{n} k_j(z)\overline{z}_j = (\alpha + \beta)z + (\alpha - \beta)\overline{z}$$

Since $\alpha \neq \beta$ the following is received:

$$\sum_{j=1}^{n} k_j(z)\overline{z}_j = \overline{z}$$

and conjugating both sides gives:

$$\sum_{j=1}^{n} \overline{k_j(z)}z_j = z$$

Hence, complex barycentric coordinates reproduce non-uniform scale if and only if (1) holds. Any complex barycentric coordinates reproduce similarity transformations by Theorem 1. Those two facts together imply that complex barycentric coordinates reproduce affine transformations if and only if (1) is satisfied.

Complex Three Point Coordinates

Theorem 5: Any set of complex functions $k_j(z)$ which satisfy $$\sum_{j=1}^{n} k_j(z)(z_j - z) = 0$$

can be represented in the form:

$$\sum_{j=1}^{n} \left( m_j(z)\frac{B_{j+1}(z)}{A_{j+1}} - m_{j-1}(z)\frac{B_{j-1}(z)}{A_j} \right)(z_j - z) = 0$$

where $m_j(z)$ are arbitrary complex functions over $\Omega$.

Proof:
Let $m_1$ be an arbitrary complex function: $m_1: \Omega \rightarrow C$, and define $m_j$, j=2..n, recursively:

$$m_j(z) = \frac{A_{j+1}A_j k_j(z) + m_{j-1}B_{j-1}(z)A_{j+1}}{B_{j+1}(z)A_j}$$

Define:

$$\hat{k}_j(z) = m_j(z)\frac{B_{j+1}(z)}{A_{j+1}} - m_{j-1}(z)\frac{B_{j-1}(z)}{A_j}$$

We claim that $\hat{k}_j(z) = k_j(z)$. This holds by construction for j=2..n. Let us show that it also holds for j=1.

From Theorem 4 (in the paper) the following is received:

$$\sum_{j=1}^{n} \hat{k}_j(z)(z_j - z) = 0$$

hence:

$$\hat{w}_1(z)(z_1 - z) = \sum_{j=2}^{n} \hat{w}_j(z)(z_j - z) = \sum_{j=2}^{n} w_j(z)(z_j - z) = w_1(z)(z_1 - z)$$

Since $z_1 - z \neq 0$, $\hat{w}_1(z) = w_1(z)$, which concludes the proof.

Limits of Discrete Cauchy Transform on the Boundary

Theorem A1: The limits of the discrete Cauchy transform $C_j(w)$ have constant and linear precision, meaning: for all $w \in S$, the following holds:

$$\sum_{j=1}^{n} C_j(w) = 1 \qquad (a)$$

$$\sum_{j=1}^{n} C_j(w) z_j = w \qquad (b)$$

Proof:
(a) By definition, the following is received:

$$\sum_{j=1}^{n} C_j(w) @ \sum_{j=1}^{n} \left( \lim_{w^{jn} \to w} C_j(w^{jn}) \right)$$

Using the rules of limits, the following is received:

$$\sum_{j=1}^{n} \left( \lim_{w^{jn} \to w} C_j(w^{jn}) \right) = \lim_{w^{jn} \to w} \sum_{j=1}^{n} C_j(w^{jn}) = \lim_{w^{jn} \to w} 1 = 1$$

which concludes the proof of (a).
(b) Again, by definition:

$$\sum_{j=1}^{n} C_j(w) z_j @ \sum_{j=1}^{n} \left( \lim_{w^{jn} \to w} C_j(w^{jn}) \right) z_j$$

Using the rules of limits, the following is received:

$$\sum_{j=1}^{n} \left( \lim_{w^{jn} \to w} C_j(w^{jn}) \right) z_j = \lim_{w^{jn} \to w} \sum_{j=1}^{n} C_j(w^{jn}) z_j = \lim_{w^{jn} \to w} w^{jn} = w$$

which concludes the proof of (b).
Constant and Linear Precision of Discrete Szego Coordinates
Theorem A2: The discrete Szego coordinates $G_j(w)$ have constant and linear precision, meaning: for all $w \in \Omega$ the following holds:

$$\sum_{j=1}^{n} G_j(w) = 1 \qquad (a)$$

$$\sum_{j=1}^{n} G_j(w) z_j = w \qquad (b)$$

Proof:
Using the definition of the Szego coordinates:

$$\sum_{j=1}^{n} G_j(w) = \sum_{j=1}^{n} \sum_{k=1}^{n} C_k(w) M_{k,j} \qquad (2)$$

$$= \sum_{k=1}^{n} C_k(w) \left( \sum_{j=1}^{n} M_{k,j} \right)$$

$$= \sum_{k=1}^{n} C_k(w) (MI_{n \times 1})_k$$

where I is a column vector of ones.

Since H is a sampling matrix over the polygon, each of its rows contains t and 1-t for some t. Hence, the rows of H sum to unity, and:

$$H_{k \times n} I_{n \times 1} = I_{k \times 1} \qquad (3)$$

Since $C_b$ have constant precision according to Theorem A1:

$$CI_{n \times 1} = I_{k \times 1}$$

Multiplying by the pseudo-inverse on both sides:

$$I_{n \times 1} = (C^*C)^{-1} C^* I_{k \times 1} \qquad (4)$$

Plugging in the expression for M, and (3) and (4):

$$MI_{n \times 1} = (C^*C)^{-1} C^* H I_{n \times 1} = (C^*C)^{-1} C^* I_{k \times 1} = I_{n \times 1}$$

And back to (2):

$$\sum_{j=1}^{n} G_j(w) = \sum_{k=1}^{n} C_k(w)(MI_{n \times 1}) = \sum_{k=1}^{n} C_k(w) = 1$$

This completes the proof of (a).
Moving to (b), the following is received:

$$\sum_{j=1}^{n} G_j(w) z_j = \sum_{j=1}^{n} \sum_{k=1}^{n} C_k(w) M_{k,j} z_j \qquad (5)$$

$$= \sum_{k=1}^{n} C_k(w) \sum_{j=1}^{n} M_{k,j} z_j$$

$$= \sum_{k=1}^{n} C_k(w)(Mz)_k$$

where z is the complex vector $z=(z_1, z_2, \ldots, z_n)$.
Since C is reproducing according to Theorem A1, i.e.:

$$\sum_{j=1}^{n} C_j(w) z_j = w$$

where for $w \in S$:

$$Cz = Hz$$

Multiplying both sides by the pseudo-inverse of C the following is received:

$$z = (C^*C)^{-1} C^* Hz$$

Plugging in the definition of M the following is received: $z=Mz$. Note that this means that z is an eigenvector of M.
Plugging this back into (5) gives:

$$\sum_{j=1}^{n} G_j(w) z_j = \sum_{k=1}^{n} C_k(w)(Mz)_k = \sum_{k=1}^{n} C_k(w) z_k = w$$

which completes the proof of (b).

Second Derivatives of the Cauchy Transform on the Boundary

The second derivatives of the discrete Cauchy transform are:

$$g''(z) = \sum_{j=1}^{n} w_j(z) z_j$$

$$w_j(z) = \frac{1}{2\pi i}\left(\frac{1}{B_{j-1}(z)B_j(z)} - \frac{1}{B_j(z)B_{j+1}(z)}\right)$$

Since the logarithm function has been eliminated, the derivatives are no longer multi-valued, and except at the vertices, the second derivative is well-defined, hence, for all $z \in S$, $z \neq \{z_1, z_2, \ldots, z_n\}$, the following holds:

$$w_j(z) = \lim_{z'' \to z} w_j(z'') = w_j(z)$$

Theorem A3: The second derivatives of the Cauchy transform satisfy: for all $z \in S$, such that $m \notin \{z_1, z_2, \ldots, z_n\}$ the following holds:

$$\sum_{j=1}^{n} w_j(z) = 0 \quad (a)$$

$$\sum_{j=1}^{n} w_j(z) z_j = 0 \quad (b)$$

Proof:
(a) From the definition of $w_j$ the following is received:

$$\sum_{j=1}^{n} w_j(z) = \frac{1}{2\pi i}\sum_{j=1}^{n}\left(\frac{1}{B_{j-1}(z)B_j(z)} - \frac{1}{B_j(z)B_{j+1}(z)}\right)$$

Splitting into two sums, and changing the summation index gives:

$$\sum_{j=1}^{n} w_j(z) = \frac{1}{2\pi i}\left(\sum_{j=1}^{n}\frac{1}{B_{j-1}(z)B_j(z)} - \sum_{j=1}^{n}\frac{1}{B_j(z)B_{j+1}(z)}\right) =$$

$$= \frac{1}{2\pi i}\left(\sum_{j=1}^{n}\frac{1}{B_{j-1}(z)\beta_j(z)} - \sum_{j=1}^{n}\frac{1}{B_{j-1}(z)\beta_j(z)}\right)$$

$$= 0$$

(b) Again, from the definition of $w_j$:

$$\sum_{j=1}^{n} w_j(z) z_j = \frac{1}{2\pi i}\sum_{j=1}^{n}\left(\frac{1}{B_{j-1}(z)B_j(z)} - \frac{1}{B_j(z)B_{j+1}(z)}\right) z_j =$$

$$= \frac{1}{2\pi i}\sum_{j=1}^{n}\left(\frac{z_j}{B_{j-1}(z)B_j(z)} - \frac{z_{j-1}}{B_{j-1}(z)B_j(z)}\right) =$$

By definition: $B_j = z_j - z$, hence:

$$z_j - z_{j-1} = z_j - z - (z_{j-1} - z) = B_j - B_{j-1}$$

Plugging this back in the previous expression:

$$\sum_{j=1}^{n} w_j(z) z_j = \frac{1}{2\pi i}\sum_{j=1}^{n}\left(\frac{B_j(z) - B_{j-1}(z)}{B_{j-1}(z)B_j(z)}\right)$$

$$= \frac{1}{2\pi i}\sum_{j=1}^{n}\left(\frac{1}{B_{j-1}(z)} - \frac{1}{B_j(z)}\right) =$$

$$= \frac{1}{2\pi i}\left(\sum_{j=1}^{n}\frac{1}{B_{j-1}(z)} - \sum_{j=1}^{n}\frac{1}{B_j(z)}\right)$$

$$= 0$$

which completes the proof.

Constant and Linear Precision of Point-2-Point Cauchy Coordinates

Theorem A4: The point-to-point Cauchy coordinates, with positional constraints $f(w_k) = f_k$ have constant and linear precision. Meaning: for all $m \in \Omega$ the following holds:

$$\sum_{j=1}^{p} D_j(m) = 1 \quad (a)$$

$$\sum_{j=1}^{p} D_j(m) w_j = m \quad (b)$$

Proof:
Going back to the definition of the point-to-point Cauchy coordinates:

$$\sum_{j=1}^{p} D_j(m) = \sum_{j=1}^{p}\sum_{k=1}^{n} C_k(m) N_{k,j}$$

$$= \sum_{k=1}^{n} C_k(m) \sum_{j=1}^{p} N_{k,j}$$

$$= \sum_{k=1}^{n} C_k(m)(N I_{p \times 1})_k$$

$$\sum_{j=1}^{p} D_j(m) w_j = \sum_{j=1}^{p}\left(\sum_{k=1}^{n} C_k(m) N_{k,j}\right) w_j$$

$$= \sum_{k=1}^{n} C_k(m) \sum_{j=1}^{p} N_{k,j} w_j$$

$$= \sum_{k=1}^{n} C_k(m)(Nw)_k$$

As was the case for the Szego coordinates, to prove constant and linear precision, it is enough to show that:

$$NI_{p \times 1} = I_{n \times 1}$$

$$Nw = z$$

Let C be the matrix, whose j-th column is $C_j(w_k)$, where $w_1, w_2, \ldots, w_p \in \Omega$ are the point constraints, and let W be the matrix whose j-th column is $W_j(m)$, where m=Hz are the samples of the polygon. Since the discrete Cauchy coordinates are constant reproducing, the following is received:

$$CI_{n \times 1} = I_{p \times 1}$$

In addition, as shown in Theorem A3:

$$WI_{n\times 1} = 0_{k\times 1}$$

Where $0_{k\times 1}$ is a column vector of k zeroes, where k is the number of samples on the boundary.
Hence, the following is received:

$$AI_{n\times 1} = \begin{pmatrix} C \\ \lambda W \end{pmatrix} I_{n\times 1} = \begin{pmatrix} I_{p\times 1} \\ 0_{k\times 1} \end{pmatrix}$$

Multiplying both sides by the pseudo-inverse of A, the following is received:

$$I_{n\times 1} = A^+ \begin{pmatrix} I_{p\times 1} \\ 0_{k\times 1} \end{pmatrix}$$

Since N is defined to be the first p columns of $A^+$, the following is received: $I_{n\times 1} = NI_{p\times 1}$, as required.
In a similar fashion, since C is linear reproducing, combined with Theorem A3, the following is received:

$$Az = \begin{pmatrix} C \\ \lambda W \end{pmatrix} z = \begin{pmatrix} w_{p\times 1} \\ 0_{k\times 1} \end{pmatrix}$$

Again, multiplying both sides by the pseudo-inverse of A, and using the definition of N the following is received:

$$z = A^+ \begin{pmatrix} w_{p\times 1} \\ 0_{k\times 1} \end{pmatrix} = Nw$$

which concludes the proof.

The MLS Complex Barycentric Coordinates

When inspecting the MLS expression for the "as-similar-as-possible" deformation, it is relatively straight-forward to see that all the expressions can be replaced by their complex representations. Let $p_i \in \Omega$ be the positions of the constrained points, and $q_i \in \boxtimes$ their target position. Let the following expressions be defined as in the MLS Schaefer S., McPhail T., Warren J.: Image deformation using moving least squares. ACM Trans. Graph. (Proc. SIGGRAPH). 23, 3 (2004), which is incorporated herein by reference:

$$w_i(z) = \frac{1}{|p_i - z|^{2\alpha}}, \; w^*(z) = \sum_i w_i(z),$$

$$p^*(z) = \frac{1}{w^*(z)} \sum_i w_i(z) p_i,$$

$$\hat{p}_i(z) = p_i - p^*(z),$$

$$q^*(z) = \frac{1}{w^*(z)} \sum_i w_i(z) q_i,$$

$$\hat{q}_i(z) = q_i - q^*(z)$$

In addition, let:

$$\mu(z) = \sum_i w_i(z) \hat{p}_i(z) \overline{\hat{p}_i(z)},$$

$$A_i(z) = w_i(z) \hat{p}_i \overline{(z - p^*(z))}$$

where $\bar{z}$ is the conjugate of z.
The MLS deformation is defined as:

$$f_{mls}(z) = \sum_i \hat{q}_i(z) \left( \frac{1}{\mu(z)} \overline{A_i(z)} \right) + q^*(z)$$

Plugging in our expressions:

$$f_{mls}(z) = \sum_i \left( q_i - \frac{1}{w^*(z)} \sum_j w_j(z) q_j \right) \left( \frac{1}{\mu(z)} \overline{A_i(z)} \right) + \frac{1}{w^*(z)} \sum_i w_i(z) q_i$$

Rearranging, to obtain the coefficients of $q_i$:

$$f_{mls}(z) = \sum_i \left( q_i - \frac{1}{w^*(z)} \sum_j w_j(z) q_j \right) \frac{\overline{A_i(z)}}{\mu(z)} +$$

$$\frac{1}{w^*(z)} \sum_i w_i(z) q_i$$

$$= \sum_i q_i \frac{\overline{A_i(z)}}{\mu(z)} - \sum_i \left( \frac{1}{w^*(z)} \sum_j w_j(z) q_j \right) \frac{\overline{A_i(z)}}{\mu(z)} +$$

$$\frac{1}{w^*(z)} \sum_i w_i(z) q_i$$

$$= \sum_i q_i \left( \frac{\overline{A_i(z)}}{\mu(z)} + \frac{w_i(z)}{w^*(z)} \right) - \frac{1}{w^*(z)}$$

$$\sum_j w_j(z) q_j \sum_i \frac{\overline{A_i(z)}}{\mu(z)}$$

Changing the summation indices, and rearranging again:

$$f_{mls}(z) = \sum_i q_i \left( \frac{\overline{A_i(z)}}{\mu(z)} + \frac{w_i(z)}{w^*(z)} \right) - \frac{1}{w^*(z)} \sum_i w_i(z) q_i$$

$$\sum_j \frac{\overline{A_j(z)}}{\mu(z)}$$

$$= \sum_i q_i \left( \frac{\overline{A_i(z)}}{\mu(z)} + \frac{w_i(z)}{w^*(z)} - \frac{w_i(z)}{w^*(z)} \sum_j \frac{\overline{A_j(z)}}{\mu(z)} \right)$$

Finally:

$$f_{mls}(z) = \sum_i M_i(z) q_i$$

$$M_i(z) = \frac{w_i(z)}{w^*(z)} \left( 1 - \sum_j \frac{\overline{A_j(z)}}{\mu(z)} \right) + \frac{\overline{A_i(z)}}{\mu(z)}$$

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

Various embodiments and aspects of the present invention as delineated hereinabove and as claimed in the claims section below find experimental support in the following examples.

Figure 15:
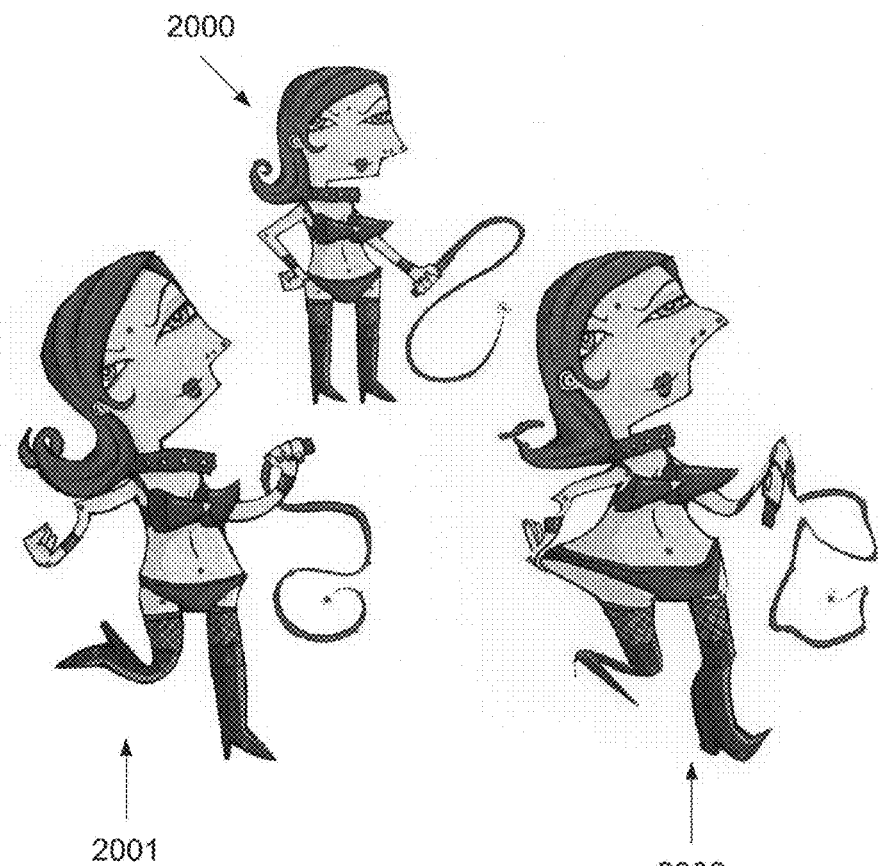

Reference is now made to an exemplary implementation of image deformation system according to the aforementioned discrete Szegö coordinates and the point-to-point Cauchy-Green coordinates. The implementation was made as a plug-in to Maya® commercial modeling and animation system. We compared their performance to that of existing state of the art planar deformation algorithms—the original cage-based Cauchy-Green coordinate as described in Lipman Y., Levin D., Cohen-Or D.: Green coordinates, ACM Trans. Graph, (Proc. SIGGRAPH), 27, 3 (2008), Which is incorporated herein by reference, and control-point-based MLS, see Schaefer S., McPhail T., Warren J.: Image deformation using moving least squares, ACM Trans. Graph, (Proc. SIGGRAPH) 23, 3 (2004), which is incorporated herein by reference. The image was represented as a texture map on a triangulation of the 2D domain, containing m vertices. Each of the n barycentric coordinates were pre-computed on these m vertices and stored in a dense complex m×n matrix B. A typical cage contains about n=150 vertices and m=15,000 interior vertices. The pre-process time to compute B is less than 10 seconds. The serial runtime complexity of a subsequent deformation operation is O(mn)—the time required to multiply B by a complex n-vector. However, this multiplication was implemented in the GPU using Nvidia's CUDA programming language on an Nvidia Geforce 8800 GTX graphics card. For example, a single deformation of the "lady with whip" image, which is depicted in FIG. 15, which has m=12,000, n=272 and p=26 control points, takes approximately 0.05 milliseconds.

As described above, the main disadvantage of the Cauchy-Green coordinates is that the image of the domain, $g(\Omega)$, might be quite far from the target contour F. On the other hand, the Szegö coordinates produce, by definition, the conformal map in the Cauchy-Green subspace, whose boundary values are closest to the target polygon.

Figure 11:
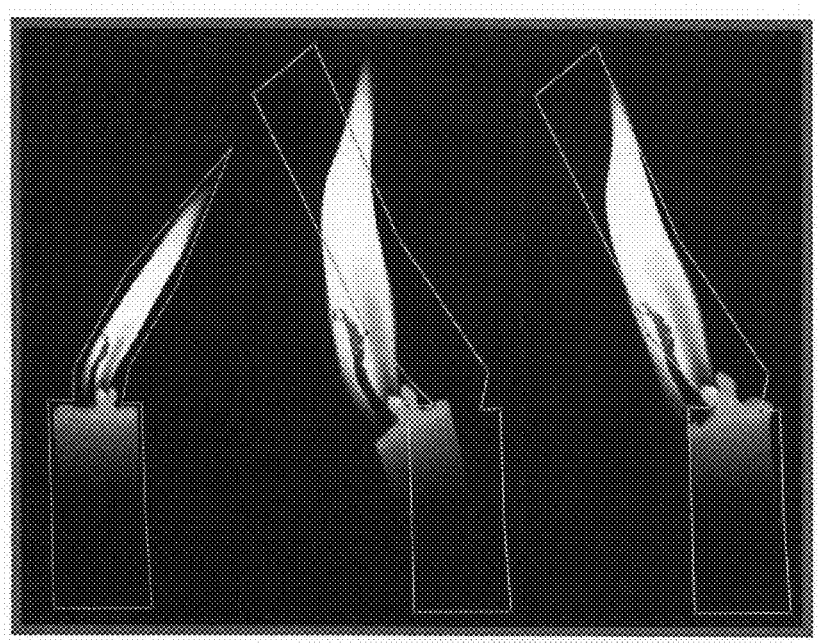
FIGS. 11 and 12 depict a data segment, exemplary deformations of the data segment according to Cauchy-Green coordinates and an exemplary mapping of the data segment 1002 according to Szegö coordinates.
Figure 12:
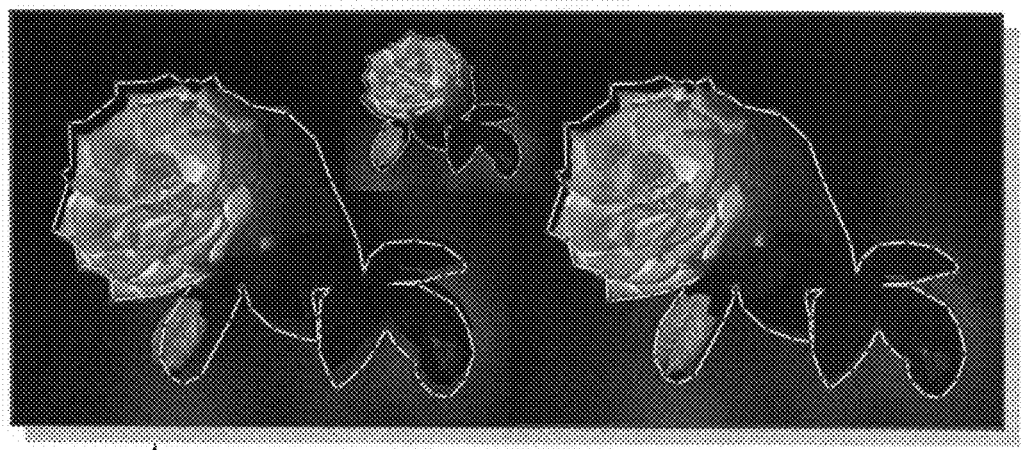

For example, FIGS. 11 and 12 depict a data segment 1000, a mapping of the data segment according to the Cauchy-Green coordinates 1001 and a mapping of the data segment 1002 according to the Szegö coordinates. Mapping according to the Szegö coordinates results in a better fit to the cage, preventing an undesirable bend of the candle, and an undesirable movement of the rose leaves. As depicted in FIG. 11 the Szegö coordinates provide a better match to the target contour. There the Szegö coordinates can also be seen to be more stable during deformation. For example, FIG. 12 depicts, from right to left, a color mapping of the absolute value of the Szegö coordinates and a color mapping of the absolute value of Cauchy-Green coordinates. The Cauchy-Green coordinate are inclined toward the leaf near it, crossing the contour of the flower shape whereas the Szegö coordinate does not.

Figure 13:
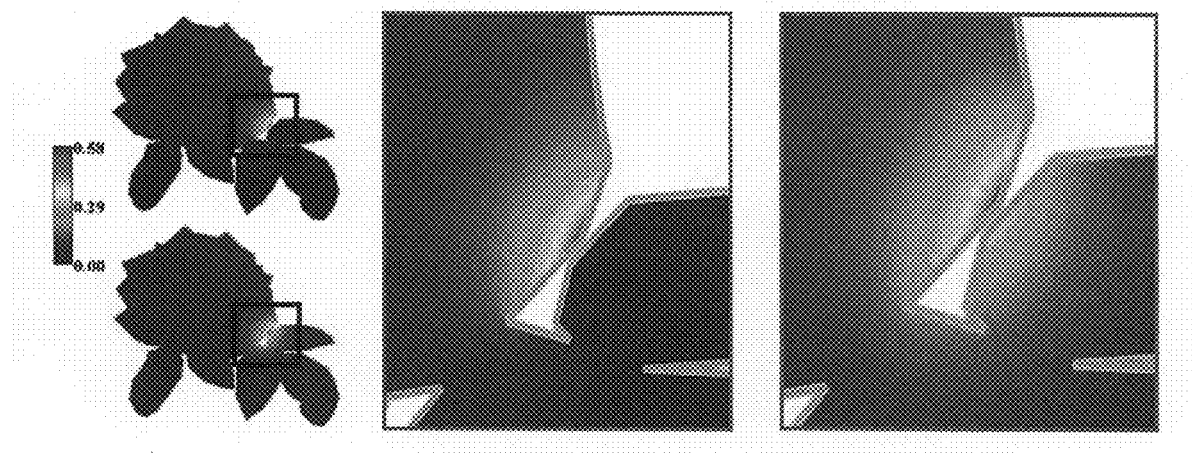
FIG. 13 is a color mapping that exemplifies that the effect of the Szegö coordinates is more local in comparison to that of the Cauchy coordinates.

In addition, the mapping according to the Szegö coordinates is local within the target cage. As depicted by the color mapping of FIG. 13, the effect of the Szegö coordinates is more local in comparison to that of the Cauchy coordinates, and a deformation of one part of the shape influences other parts which are geodesically remote.

The computation of a correction matrix M is performed in the preprocess step, after the source cage is defined but before the actual deformation. Thus, the runtime complexity of the preprocess step depends on k—the source contour sample density, but the runtime complexity of the actual deformation is exactly the same as that of the Cauchy-Green coordinates.

Point to Point Cauchy-Green vs. MLS Example

In some scenarios cage deformations are not very useful. If the cage is complicated, as is usually the case for real-life shapes, cage-controlled deformations are less intuitive than a small number of simple control points strategically placed in the domain. This interface was also used by Igarashi T., Moscovich T., Hughes J.-F.: As-Rigid-As-Possible shape manipulation, ACM Trans. Graph, (Proc. SIGGRAPH). 24, 3, (2005), pp. 1134-1141, which is incorporated herein by reference and the MLS system, see Schaefer S., McPhail T., Warren J.: Image deformation using moving least squares, ACM Trans. Graph, (Proc. SIGGRAPH). 23, 3 (2004), which is incorporated herein by reference.

Figure 14:
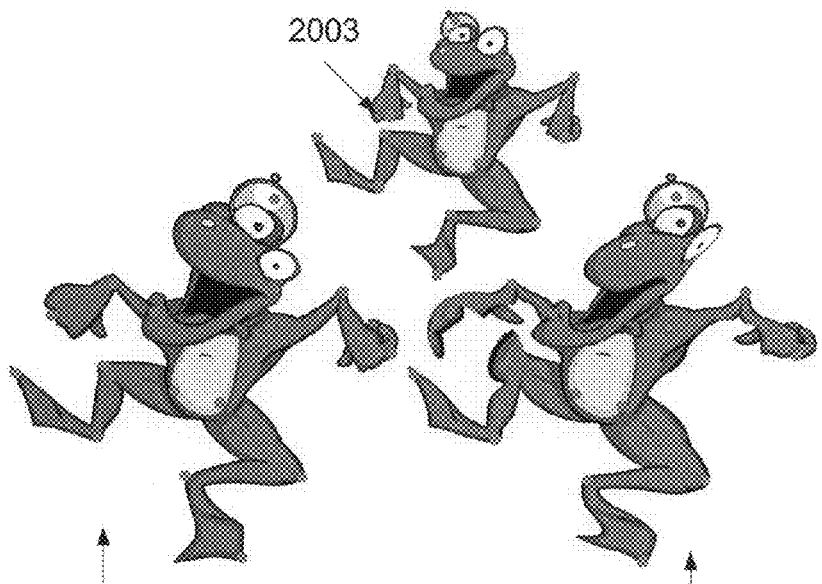
FIGS. 14 and 15 depict a data segment and exemplary deformations which are performed by P2P Cauchy-Green and MLS coordinates.

For example, each one of FIGS. 14 and 15 depicts a data segment 2000 and a deformation that is performed by P2P Cauchy-Green coordinates 2001 and MLS coordinates 2002. As depicted in FIGS. 14 and 15, the P2P Cauchy-Green coordinates better handle control points whose Euclidean distance is small, yet their geodesic distance within the cage is large.

Specifically, MLS allows defining a set of control points and finds a local as-similar-as-possible or as-rigid as-possible deformation which satisfies the positional constraints imposed by the control points. As the point-to-point Cauchy-Green approach produces a conformal map by definition, the most relevant comparison is to the similarity version of MLS. Close examination of the MLS equations reveals that there exist complex barycentric coordinates which are equivalent to the similarity version.

FIG. 14 depicts deformations generated by both methods with exactly the same constraints when a certain vertex is manipulated 2003. The results show that point-to-point Cauchy-Green coordinates better preserve the geometry of the shape. Using the additional information, which is defined by the cage, the method separates the extremities more efficiently, such as the hand of the frog is fully separated from its leg. Since the MLS method deforms the entire plane, ignoring the geometry of the shape, separating the hand of the frog from its foot results in serious artifacts. On the other hand, as opposed to the MLS method, the point-to-point Cauchy-Green coordinates do not satisfy the positional constraints imposed by the control points precisely; rather treat them as soft constraints. This may be alleviated, if needed, by reducing the value of $\lambda$ for optimization, as described above, albeit at the expense of the mapping smoothness.

Figure 16:
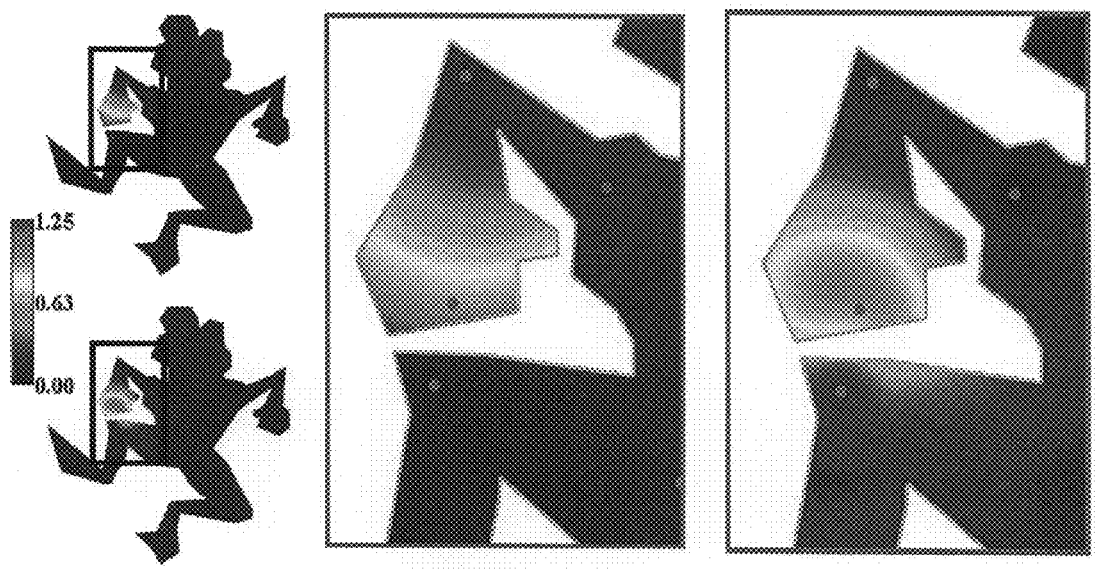
FIG. 16 is a color mapping that compares the absolute values of the exemplary MLS coordinates and the absolute values of the exemplary point-to-point Cauchy-Green coordinates of FIG. 14.

As stated above, the MLS deformation may be formulated as complex barycentric coordinates centered on the control points. Since the MLS has no knowledge of the cage, the coordinates' effect depends on Euclidean distances. This is clearly seen in FIG. 16 which is a color mapping, based on FIG. 14, which compares the absolute values of the MLS coordinates 2002 and the absolute values of the point-to-point Cauchy-Green coordinates 2001. In addition, it might be possible to modify MLS to use geodesic distances instead of Euclidean distances, but this would require discretization of the interior of the cage, which we wish to avoid.

The computational complexity of a deformation using P2P Cauchy-Green coordinates is similar to that of the computational complexity of a deformation using Szegö coordinates, as most of the computation is performed as a preprocessing step. Here, however, an additional benefit is accomplished as the complexity of the deformation during user interaction is proportional to p, the number of control points, as opposed to n, the number of cage vertices, which is typically much larger, as described above.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of deforming a geometric object, comprising:
    providing a data segment representing a geometric object;
    defining a contour having a plurality of control points enclosing said geometric object in said data segment;
    calculating a plurality of complex number coefficients according to said plurality of control points;
    calculating, using a processor, a plurality of barycentric coordinates having said plurality of complex number coefficients according to said enclosing contour;
    receiving user input to manipulate said enclosing contour to a target contour; and
    using said plurality of barycentric coordinates according to said target contour for mapping said geometric object to a target geometric object.

2. The method of claim 1, wherein said data segment comprises an image.

3. The method of claim 2, wherein said image is defined according to a member of a group consisting of a bitmap image format and a vector image format.

4. The method of claim 2, wherein said providing comprises displaying said image to a user.

5. The method of claim 1, wherein said user input comprising a manipulation to at least one of said plurality of control points, and said mapping comprising applying said plurality of barycentric coordinates to said plurality of manipulated control points.

6. The method of claim 1, wherein said target geometric object is bounded by said target contour.

7. The method of claim 1, wherein said contour is polygonal, said a plurality of control points are plurality of vertices.

8. The method of claim 1, wherein said plurality of complex number coefficients are calculated according to Cauchy kernel.

9. The method of claim 1, wherein said enclosing contour has a B-spline contour.

10. The method of claim 1, wherein said calculating comprises calculating a complex integral according to said plurality of control points and using said complex integral for calculating said plurality of complex number coefficients.

11. The method of claim 1, wherein said mapping is based on a complex deformation function defined according to said plurality of barycentric coordinates.

12. The method of claim 1, wherein said plurality of barycentric coordinates are calculated according to edges of said enclosing contour.

13. The method of claim 1, wherein said plurality of barycentric coordinates are defined for mapping each point in said geometric object according to a non Euclidean distance thereof from at least one of said plurality of control points.

14. The method of claim 1, wherein said specifying comprising selecting each said control point according to a compliance with a finite set of positional constraints.

15. The method of claim 1, wherein said specifying comprising receiving an additional user input defining said plurality of said control points.

16. The method of claim 1, wherein said enclosing comprises automatically segmenting said geometric object.

17. The method of claim 1, wherein said data segment is a member of a group consisting of: a digital image, a bitmap, and a video frame.

18. A computer program product, comprising a computer usable medium having a computer readable program code embodied therein, said computer readable program code having program instructions to be executed to implement a method of deforming an image, comprising:
    providing a data segment representing a geometric object;
    defining a contour enclosing said geometric object in said data segment, said contour having a plurality of control points;
    calculating a plurality of complex number coefficients according to said plurality of control points;
    calculating said plurality of barycentric coordinates having complex number coefficients according to said enclosing contour;
    receiving user input to manipulate said enclosing contour to a target contour; and
    using said plurality of complex barycentric coordinates according to said target contour for mapping said geometric object to a target geometric object.

19. The computer program product of claim 18, wherein said plurality of complex number coefficients are defined for mapping each said pixel according to a non Euclidean distance thereof from at least one of said plurality of control points.

20. The computer program product of claim 18, wherein said specifying comprising selecting each said control point according to a compliance with a finite set of positional constraints.

21. A system for estimating image similarity, comprising:
    a processor;
    an input unit configured for receiving a data segment having a geometric object enclosed by a contour having a and a manipulation of said contour being indicative to a target contour having a plurality of control points;
    a deformation unit configured for calculating a plurality of complex number coefficients according to said plurality of control points and calculating a complex deformation function having said plurality of complex number coefficients according to said target contour and deforming said geometric object according to said complex deformation function using said processor; and an output module configured for outputting a new image depicting said deformed geometric object.

22. A computerized method of coloring a geometric object, comprising:

providing an image data representing a geometric object;

defining a plurality of control points on said geometric object;

calculating a plurality of complex number coefficients according to said plurality of control points;

calculating, using a processor, a plurality of barycentric coordinates having said plurality of complex number coefficients according to said plurality of control points;

specifying a plurality of complex color values for said plurality of control points; and coloring a plurality of points in said geometric object each by using said plurality of barycentric coordinates according to said plurality of complex color values.

* * * * *